United States Patent
Watanabe et al.

(10) Patent No.: US 9,491,455 B2
(45) Date of Patent: Nov. 8, 2016

(54) PICTURE ENCODING METHOD, PICTURE DECODING METHOD, PICTURE ENCODING APPARATUS, PICTURE DECODING APPARATUS, PICTURE ENCODING PROGRAM, AND PICTURE DECODING PROGRAM

(75) Inventors: Mayuko Watanabe, Yokosuka (JP); Masaki Kitahara, Yokosuka (JP); Atsushi Shimizu, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 190 days.

(21) Appl. No.: 14/233,826

(22) PCT Filed: Jul. 31, 2012

(86) PCT No.: PCT/JP2012/069495
§ 371 (c)(1),
(2), (4) Date: Jan. 20, 2014

(87) PCT Pub. No.: WO2013/018806
PCT Pub. Date: Feb. 7, 2013

(65) Prior Publication Data
US 2014/0146887 A1    May 29, 2014

(30) Foreign Application Priority Data
Aug. 1, 2011   (JP) ................. 2011-167934

(51) Int. Cl.
*H04N 19/157* (2014.01)
*H04N 19/14* (2014.01)
(Continued)

(52) U.S. Cl.
CPC ...... *H04N 19/00157* (2013.01); *H04N 19/105* (2014.11); *H04N 19/14* (2014.11);
(Continued)

(58) Field of Classification Search
CPC ................ H04N 19/00157; H04N 19/00278; H04N 19/00024
See application file for complete search history.

(56) References Cited

U.S. PATENT DOCUMENTS 6,542,547 B1   4/2003   Wong
7,782,936 B2   8/2010   Kondo et al.
(Continued)

FOREIGN PATENT DOCUMENTS

JP   64-007854 A    1/1989
JP   08-307865 A   11/1996
(Continued)

OTHER PUBLICATIONS

Office Action, Canadian Patent Application No. 2,842,670, Jul. 31, 2015.
(Continued)

*Primary Examiner* — Dave Czekaj
*Assistant Examiner* — Nam Pham
(74) *Attorney, Agent, or Firm* — Harness, Dickey & Pierce, P.L.C.

(57) ABSTRACT

The encoding computational complexity and the decoding computational complexity are reduced while suppressing deterioration of coding efficiency in comparison with conventional intra divided-picture coding. A divided picture generation unit divides an input encoding target picture into blocks having the same size, and collects pixels having the same relative position in the blocks to generate divided pictures having the same size. An intra divided-picture encoding unit performs intra divided-picture encoding on some divided pictures. A reference picture selection unit selects, as a reference picture, an encoded divided picture in which a pixel position on an original picture is close in order to encode the other encoding target divided pictures. An inter divided-picture predictive encoding unit generates a predicted picture using the selected reference picture and encodes an encoding target divided picture through inter divided-picture prediction in units of divided pictures.

18 Claims, 18 Drawing Sheets

(51) Int. Cl.
*H04N 19/105* (2014.01)
*H04N 19/503* (2014.01)
*H04N 19/176* (2014.01)
*H04N 19/593* (2014.01)
*H04N 19/119* (2014.01)
*H04N 19/33* (2014.01)

(52) U.S. Cl.
CPC ......... *H04N 19/176* (2014.11); *H04N 19/503* (2014.11); *H04N 19/593* (2014.11); *H04N 19/119* (2014.11); *H04N 19/33* (2014.11)

(56) References Cited

U.S. PATENT DOCUMENTS

| | | |
|---|---|---|
| 2004/0218675 A1 | 11/2004 | Kim et al. |
| 2005/0047506 A1 | 3/2005 | Kadono et al. |
| 2006/0013305 A1* | 1/2006 | Sun ..................... H04N 19/172 375/240.12 |
| 2006/0285594 A1 | 12/2006 | Kim et al. |
| 2007/0071087 A1* | 3/2007 | Kim ..................... H04N 19/176 375/240.1 |
| 2009/0080531 A1 | 3/2009 | Hashiguchi et al. |
| 2009/0268820 A1 | 10/2009 | Nishida |

FOREIGN PATENT DOCUMENTS

| | | |
|---|---|---|
| JP | 2002-118861 A | 4/2002 |
| JP | 2003-092684 A | 3/2003 |
| JP | 2006-080933 A | 3/2006 |
| JP | 2009-077176 A | 4/2009 |
| JP | 2009-130467 A | 6/2009 |
| JP | 2009-296300 A | 12/2009 |
| KR | 10-2009-0075608 A | 7/2009 |
| RU | 2 374 786 C1 | 11/2009 |
| TW | I328969 | 8/2010 |
| TW | I343217 | 6/2011 |
| WO | 2008/062687 A1 | 5/2008 |
| WO | 2010/149626 A1 | 12/2010 |

OTHER PUBLICATIONS

ITU-T Rec. H.264, "Advanced video coding for generic audiovisual services", Mar. 2005.
J. Yang, B. Yin, Y. Sun, and N. Zhang, "A block-matching based intra frame prediction for H.264/AVC", in Proceedings of IEEE International Conference on Multimedia and Expo (ICME '06), pp. 705-708, Toronto, Canada, Jul. 2006.
International Search Report for PCT/JP2012/069495, mailed Nov. 6, 2012; ISA/JP.
Smolic, Aljoscha, et al., "Coding Algorithms for 3DTV—A Survey," IEEE Transactions on Circuits and Systems for Video Technology, vol. 17, No. 11, Nov. 2007, pp. 1606-1621.
Segall, C. Andrew, et al., "Spatial Scalability Within the H.264/AVC Scalable Video Coding Extension," IEEE Transactions on Circuits and Systems for Video Technology, vol. 17, No. 9, Sep. 2007, pp. 1121-1135.
Wiegand, Thomas, et al., "Overview of the H264/AVC Video Coding Standard," IEEE Transactions on Circuits and Systems for Video Technology, vol. 13, No. 7, Jul. 2003, pp. 560-576.
Notice of Reasons for Rejection, Japanese Patent Application No. 2011-167934, Dec. 2, 2014.
Search Report, European Patent Application No. 12819900.7, Jan. 26, 2015.
Office Action, Taiwanese Patent Application No. 101127163, Apr. 14, 2015.
Notice of Non-Final Rejection, Korean Patent Application No. 10-2014-7001525, Apr. 30, 2015.
Decision on Grant, Russian Patent Application No. 2014101694, Dec. 3, 2015.
Office Action, Canadian Patent Application No. 2,842,670, Jun. 21, 2016.

* cited by examiner

Bj0 Bj1 Bj2
       ···      ··· Bjk ···      ···

DIVIDED PICTURES

```
      P0              P1              P2                    PK
  B00 B10 B20    B01 B11 B21    B02 B12 B22            B0K B1K B2K
  B30 B40 ···    B31 B41 ···    B32 B42 ···      ···   B3K B4K ···
  ··· ··· ···    ··· ··· ···    ··· ··· ···            ··· ··· ···
```

PICTURE ENCODING METHOD, PICTURE DECODING METHOD, PICTURE ENCODING APPARATUS, PICTURE DECODING APPARATUS, PICTURE ENCODING PROGRAM, AND PICTURE DECODING PROGRAM

TECHNICAL FIELD

The present invention relates to picture encoding and decoding technologies, and more particularly, to a picture encoding method, a picture decoding method, a picture encoding apparatus, a picture decoding apparatus, a picture encoding program, and a picture decoding program which realize encoding and decoding that reduce the decoding computational complexity while suppressing deterioration of coding efficiency in comparison with conventional intra-frame predictive encoding and decoding.

Priority is claimed on Japanese Patent Application No. 2011-167934, filed Aug. 1, 2011, the content of which is incorporated herein by reference.

BACKGROUND ART

In H.264, which is an international standard for picture coding, intra-frame predictive coding is performed in order to improve a compression rate in coding using correlation of pixels between blocks (see Non-Patent Document 1). This intra-frame prediction is performed in units of blocks in which some pixels are collected, and three types of block sizes of 4×4, 8×8, and 16×16 are available to a luminance signal. Furthermore, a plurality of prediction modes are selectable for each block size.

This H.264 uses a method based on extrapolation prediction at the time of intra-frame prediction, but there is a problem in that prediction efficiency thereof is low. In order to solve this problem, suppression of block distortion using a deblocking filter for an entire frame is performed and thus the computational complexity increases.

Furthermore, technology described in Non-Patent Document 2 is known as a scheme for improving coding efficiency in intra-frame prediction. This technology is a scheme for searching an encoded area for a block having a smaller error with respect to an encoding target block in the intra-frame prediction and performing encoding using a prediction error thereof.

FIG. 18 is a flowchart illustrating an example of an intra-frame predictive encoding process in accordance with conventional technology. In intra-frame predictive encoding of Non-Patent Document 2, first, an encoding target picture is divided into N blocks 1 to N having the same size (step S301). Then, the intra-frame predictive encoding is performed on the first block 1 (step S302). Subsequently, in encoding of block 2 and subsequent blocks, inter-frame predictive encoding is performed using a block having a smaller prediction error in an encoded area as a reference picture and information on a motion vector to the reference picture and a prediction error are encoded (step S303). This process of step S303 is repeated up to the last block N.

PRIOR ART DOCUMENTS

Non Patent Documents

Non Patent Document 1: ITU-T Rec. H.264, "Advanced video coding for generic audiovisual services", March 2005.

Non Patent Document 2: J. Yang, B. Yin, Y. Sun, and N. Zhang, "A block-matching based intra frame prediction for H.264/AVC", in Proceedings of IEEE International Conference on Multimedia and Expo (ICME '06), pp. 705-708, Toronto, Canada, July 2006.

SUMMARY OF INVENTION

Problems to be Solved by the Invention

The technology of Non-Patent Document 2 is a scheme for improving coding efficiency, and a quantization error tends to be reduced since the generation of the prediction error in an area in which the same pattern is repeated can be suppressed. Therefore, it is considered possible to reduce the processing complexity of the deblocking filter.

However, while the method described above may be effective for a picture in which the same pattern is repeated, it is not effective for a picture in which substantially the same pattern does not appear; in this case, it is not considered possible to greatly reduce the prediction error and reduce the quantization error. In this case, since the processing complexity of the deblocking filter cannot be reduced either, it is considered ineffective for reduction of computational complexity in decoding. Furthermore, since it is necessary to send offset vector information indicating a relative position between a reference block and each block to a decoding end, a computation of decoding reference block information occurs on the decoding end, and thus there is a problem in that the computational complexity is still large.

Instead of searching for a motion vector as in Non-Patent Document 2, considering a case in which a reference picture is selected using a different method, a predicted picture is produced using the reference picture, and a prediction error is encoded, coding efficiency is greatly affected by an encoded picture used as the reference picture. Therefore, there is a need for a scheme using an appropriate picture as a reference picture.

An object of the present invention is to reduce the encoding computational complexity and the decoding computational complexity while suppressing deterioration of coding efficiency to thereby solve the problems described above.

Means for Solving the Problems

In order to solve the problems described above, the present invention performs the following process in performing compression encoding on an input picture.

(1) The input picture is divided into blocks of n×m pixels, each divided block is divided into sub-blocks having $n_1 \times m_1$ pixels (where $1 \leq n_1 < n$ and $1 \leq m_1 < m$), and sub-blocks having the same relative position in the blocks are collected to generate divided pictures having the same size.

(2) Intra divided-picture encoding is performed on at least one of the divided pictures. Here, the intra divided-picture encoding is encoding by intra-frame prediction performed using the divided pictures as units of frames.

(3) In order to encode a divided picture other than the divided picture subjected to the intra divided-picture encoding, the encoded divided picture is selected as a reference picture to be used for inter divided-picture predictive encoding for an encoding target divided picture in order of increasing distances on the original picture for pixels at the same position in the encoding target divided picture and the encoded divided picture.

(4) A predicted picture for the encoding target divided picture is generated using the selected reference picture to perform the inter divided-picture predictive encoding. In this inter divided-picture predictive encoding, for example, a picture obtained by applying, to the reference picture, a predetermined filter determined based on a relative position between corresponding pixels on the original picture of the encoding target divided picture and the reference picture is used as the predicted picture to perform the inter divided-picture predictive encoding. Here, the inter divided-picture predictive encoding is encoding by inter-frame prediction performed using each divided picture as units of frames.

(5) Information source encoding is performed on encoding results in the intra divided-picture encoding and the inter divided-picture predictive encoding and an encoded bit stream is output.

Furthermore, as one aspect of the invention described above, in selection of the reference picture, a reference list in which a plurality of selected reference pictures are arranged may be designated, and the predicted picture for the encoding target divided picture may be generated using one or a plurality of reference pictures among the plurality of reference pictures recorded in the reference list when the inter divided-picture predictive encoding is performed.

Furthermore, as one aspect of the invention described above, in selection of the reference picture, when there are a plurality of encoded divided pictures having the same distance between pixels on the original picture for the encoding target picture, a divided picture for which the intra divided-picture encoding has been completed may be preferentially selected as the reference picture over a divided picture for which the inter divided-picture predictive encoding has been completed. Furthermore, when there are a plurality of encoded divided pictures having the same distance between pixels on the original picture, an encoded divided picture having higher quantization precision may be preferentially selected as the reference picture over an encoded divided picture having lower quantization precision.

Furthermore, as one aspect of the invention described above, in selection of the reference picture, the reference picture may be selected from among a plurality of encoded divided pictures capable of being used as reference pictures based on a reference picture selection rule indicating an encoded divided picture to be preferentially selected, and designation information for the reference picture selection rule may be encoded and reported to a decoding end. For example, the reference picture selection rule may include a rule which designate to preferentially select, as the reference picture, the divided picture for which the intra divided-picture encoding has been completed over the divided picture for which the inter divided-picture predictive encoding has been completed when there are a plurality of encoded divided pictures having the same distance between pixels on the original picture, or a rule which designates to preferentially select, as the reference picture, an encoded divided picture having higher quantization precision over an encoded divided picture having lower quantization precision when there are a plurality of encoded divided pictures having the same distance between pixels on the original picture. A reference list generation rule which defines the reference picture selection rule for a plurality of reference pictures may be used. Here, the reference picture selection rule and the reference list generation rule may be considered to be substantially synonymous as a technical concept.

Furthermore, as one aspect of the invention described above, in the inter divided-picture predictive encoding, inter divided-picture predictive encoding may be performed using a predicted picture obtained by combining a plurality of predicted pictures generated from a plurality of reference pictures.

Furthermore, as one aspect of the invention described above, a method in which when a specific reference picture is selected from among candidates of a plurality of reference pictures and used for generation of the predicted picture in the inter divided-picture predictive encoding, a reference picture index which designates the reference picture is encoded and which reference picture has been used is reported to the decoding end may be used.

Furthermore, the present invention performs the following process in performing decoding on encoded data of a picture subjected to compression encoding.

(1) The encoded data is received and subjected to information source encoding, the encoded data is obtained by a picture encoding apparatus dividing an input picture into blocks of n×m pixels, dividing each divided block into sub-blocks having $n_1 \times m_1$ pixels (where $1 \le n_1 < n$ and $1 \le m_1 < m$), and collecting sub-blocks having the same relative position in the blocks to generate and encode divided pictures having the same size.

(2) Intra divided-picture decoding is performed on at least one of the divided pictures from decoded data.

(3) A decoded divided picture is selected as a reference picture to be used for inter divided-picture predictive decoding for a decoding target divided picture in order of increasing distances on an original picture for pixels at the same position in the decoding target divided picture and the decoded divided picture when a divided picture other than the divided picture subjected to the intra divided-picture decoding is decoded.

(4) A predicted picture for the decoding target divided picture is generated using the selected reference picture and the inter divided-picture predictive decoding is performed.

(5) A decoded picture is formed from the divided pictures decoded through the intra divided-picture decoding and the inter divided-picture predictive decoding by returning each pixel in each divided picture to an original position in the original picture.

Furthermore, as one aspect of the invention described above, decoding may be performed on encoded data which designates a reference picture selection rule (the same applies to a reference list generation rule) indicating a decoded divided picture to be preferentially selected from among a plurality of decoded divided pictures capable of being used as reference pictures, and the reference picture may be selected based on the decoded reference picture selection rule. For example, the reference picture selection rule may include a rule which designates to preferentially select, as the reference picture, a divided picture for which the intra divided-picture decoding has been completed over a divided picture for which the inter divided-picture predictive decoding has been completed when there are a plurality of decoded divided pictures having the same distance between pixels on the original picture, or a rule which designate to preferentially select, as the reference picture, a decoded divided picture having higher quantization precision over a decoded divided picture having lower quantization precision when there are a plurality of decoded divided pictures having the same distance between pixels on the original picture.

Furthermore, as one aspect of the invention described above, in the inter divided-picture predictive decoding, inter divided-picture predictive decoding may be performed using a predicted picture obtained by combining a plurality of predicted pictures generated from a plurality of reference pictures.

Furthermore, as one aspect of the invention described above, if a reference picture index which designates the reference picture is included in the encoded data, the reference picture index may be decoded, and the reference picture designated by the decoded reference picture index may be selected when the reference picture is to be selected.

Operation of the present invention is as follows. In the present invention, one or a plurality of pixels (sub-blocks) are extracted at equal intervals from an input picture and the sub-blocks are collected to generate a plurality of divided pictures, and intra divided-picture encoding is performed to encode at least one divided picture using only the divided picture. For encoding of the other divided pictures, inter divided-picture predictive encoding is performed using encoded divided pictures. In other words, a predicted picture is generated by using an encoded divided picture as a reference picture and applying, for example, a filter as used to generate an interpolated picture with fractional pixel precision to the reference picture in accordance with a relative positional relationship between a pixel included in an encoding target divided picture and a pixel included in the encoded divided picture based on the reference picture, and an error signal between the predicted picture and the encoding target divided picture is encoded.

It is possible to realize encoding with which block distortion is suppressed with lower computational complexity than that of conventional technologies by performing encoding using such a method.

Particularly, in the present invention, when a reference picture to be used for inter divided-picture predictive encoding is selected from among encoded divided pictures, an encoded divided picture is selected as the reference picture in order of increasing distances between pixels on the original picture for pixels at the same position in an encoding target divided picture and the encoded divided picture. Therefore, information of pixels in all directions around the encoding target can be used for prediction, unlike a case in which only encoded pixels within the same frame are used for prediction as in Non-Patent Document 2. Furthermore, an encoded divided picture having a high correlation with the encoding target divided picture is selected as the reference picture, unlike a case in which any encoded divided picture is set as the reference picture. Therefore, a prediction error becomes small, and prediction efficiency can be increased and coding efficiency can be improved without increasing the decoding computational complexity.

Furthermore, in one aspect of the present invention, when a reference picture for a divided picture for which encoding of a prediction error is performed is selected, the encoded divided picture to be used is not limited to one divided picture and a plurality of encoded divided pictures are used as reference pictures. Accordingly, it is possible to adaptively select the reference picture from among the encoded divided pictures considered to have a high correlation with the encoding target divided picture and generate a predicted picture, and thus prediction efficiency can be increased.

Furthermore, in one aspect of the present invention, when there are a plurality of encoded divided pictures at pixel positions having the same relative distance for pixels of an encoding target picture on the original picture, a divided picture for which the intra divided-picture encoding has been completed is preferentially used as the reference picture over a divided picture for which the inter divided-picture predictive encoding has been completed. Since intra-frame encoding usually realizes encoding with a smaller quantization error than inter-frame encoding, the predicted picture is generated by preferentially using the divided picture for which the intra divided-picture encoding has been completed, which is considered to have high quantization precision, as a reference picture, thereby prediction efficiency can be increased.

Furthermore, in one aspect of the present invention, when there are a plurality of encoded divided pictures at pixel positions having the same relative distance for pixels of an encoding target picture on the original picture, an encoded divided picture having a smaller quantization step is preferentially used as the reference picture over an encoded divided picture having a larger quantization step. Prediction efficiency can be increased and coding efficiency can be improved by using the encoded divided picture having a smaller quantization step as the reference picture.

Some reference picture selection rules (or reference list generation rules) which define an encoded divided picture to be selected as the reference picture are determined in advance in an encoding end and the decoding end, and the encoding end encodes information indicating a reference picture selection rule to be used to select the reference picture among the reference picture selection rules and reports to the decoding end. Accordingly, a method for selecting the reference picture becomes flexible, and even when there are a plurality of candidates of reference pictures, the same reference picture can be selected in the encoding end and the decoding end.

Furthermore, in one aspect of the present invention, a plurality of encoded divided pictures are used as reference pictures, and a plurality of predicted pictures generated from a plurality of reference pictures are combined to generate a predicted picture. Accordingly, prediction efficiency can be increased. In combining the predicted pictures, for example, an average picture of the predicted pictures generated from the individual reference pictures is calculated.

Furthermore, when, for example, a specific reference picture that provides a smaller rate distortion cost (RD cost) is adaptively selected from among candidates of a plurality of reference pictures and used for generation of the predicted picture in inter divided-picture predictive encoding, a reference picture index which designates the reference picture is encoded and reported to the decoding end. Accordingly, efficient decoding can be performed on the decoding end using the same divided picture as that used in encoding as the reference picture.

Advantageous Effects of the Invention

In accordance with the present invention, it is possible to reduce the encoding computational complexity and the decoding computational complexity while suppressing deterioration of coding efficiency in comparison with conventional intra-frame predictive coding.

BRIEF DESCRIPTION OF DRAWINGS

FIG. 2C is a diagram illustrating an example of generation of divided pictures in the divided picture generation unit.

FIG. 2D is a diagram illustrating an example of generation of divided pictures in the divided picture generation unit.

MODES FOR CARRYING OUT THE INVENTION

Hereinafter, embodiments of the present invention will be described with reference to drawings.

[Picture Encoding Apparatus]

Figure 1:
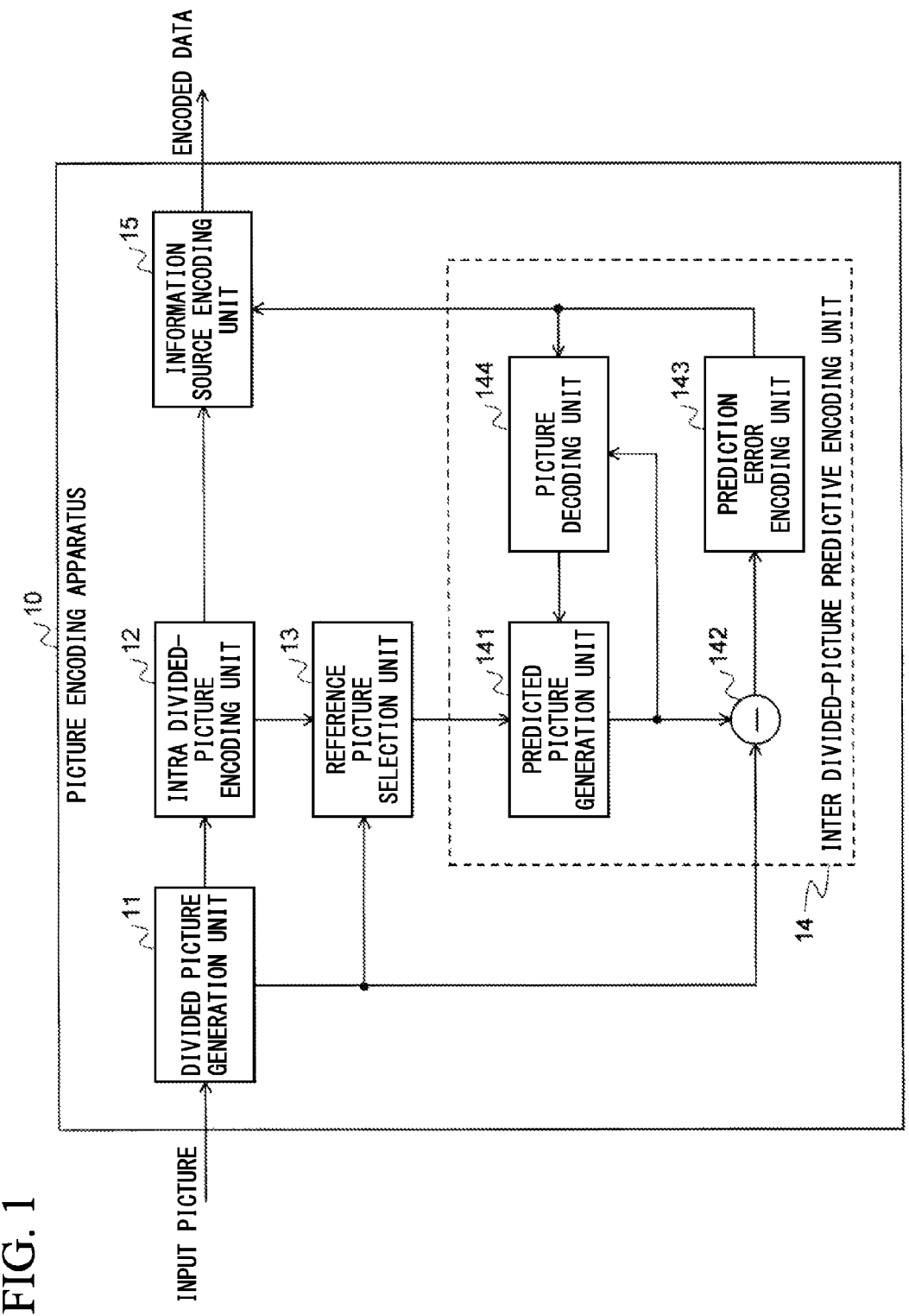
FIG. 1 is a diagram illustrating an example of a configuration of a picture encoding apparatus.

FIG. 1 is a diagram illustrating an example of a configuration of a picture encoding apparatus. A picture encoding apparatus 10 includes a divided picture generation unit 11, an intra divided-picture encoding unit 12, a reference picture selection unit 13, an inter divided-picture predictive encoding unit 14, and an information source encoding unit 15. The inter divided-picture predictive encoding unit 14 includes a predicted picture generation unit 141, a prediction error calculation unit 142, a prediction error encoding unit 143, and a picture decoding unit 144.

The divided picture generation unit 11 divides an input picture into blocks of n×m pixels and divides each divided block into sub-blocks of $n_1 \times m_1$ pixels (where $1 \leq n_1 < n$ and $1 \leq m_1 < m$), and collects sub-blocks having the same relative position in the blocks to generate divided pictures having the same size.

Figures 2A, 2B:
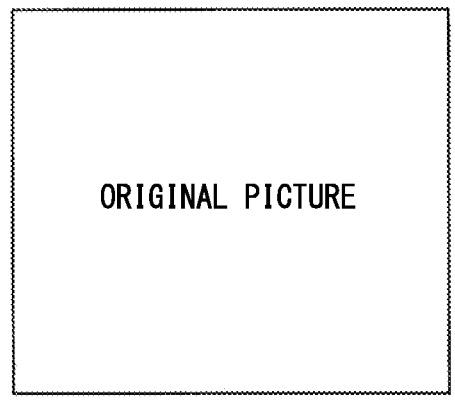
FIG. 2A is a diagram illustrating an example of generation of divided pictures in a divided picture generation unit.
FIG. 2B is a diagram illustrating an example of generation of divided pictures in the divided picture generation unit.

FIGS. 2A to 2D are diagrams illustrating an example in which divided pictures are generated by the divided picture generation unit 11. The divided picture generation unit 11 receives, for example, an original picture illustrated in FIG. 2A as the input picture and divides the original picture into blocks Mj (j=0, 1, . . . , J) each having n×m pixels, as illustrated in FIG. 2B. Then, the divided picture generation unit 11 divides each block Mj into sub-blocks Bjk (k=0, 1, . . . , K) having $n_1 \times m_1$ pixels (where $1 \leq n_1 < n$ and $1 \leq m_1 < m$), as illustrated in FIG. 2C.

Next, the divided picture generation unit 11 collects sub-blocks Bjk having the same relative position in the blocks from each block Mj to generate divided pictures Pk (k=0, 1, . . . , K) having the same size, as illustrated in FIG. 2D. The divided picture P0 is a set of sub-blocks B00, B10, . . . , BJ0, the divided picture P1 is a set of sub-blocks B01, B11, . . . , BJ1, and the divided picture PK is a set of sub-blocks B0K, B1K, . . . , BJK.

The intra divided-picture encoding unit 12 performs intra divided-picture encoding on some divided pictures including a first divided picture generated by the divided picture generation unit 11 (or on only the first divided picture). The intra divided-picture encoding herein is an encoding method which performs encoding using only pixel information of a divided picture which is a current encoding target. Any encoding method may be used as long as another divided picture is not referred to in the encoding method. For example, a method such as intra predictive encoding in the H.264 coding scheme may be used.

The reference picture selection unit 13 selects an encoded divided picture as a reference picture to be used for inter divided-picture predictive encoding of an encoding target divided picture in order of increasing distances on an original picture for pixels at the same position in the encoding target divided picture and the encoded divided picture. Here, a plurality of encoded divided pictures may be selected as reference pictures in order of increasing distances on the original picture.

The inter divided-picture predictive encoding unit 14 performs inter divided-picture predictive encoding on a divided picture which has not yet been encoded among the divided pictures generated by the divided picture generation unit 11. The inter divided-picture predictive encoding herein is an encoding method which performs predictive encoding using the encoded divided picture selected by the reference picture selection unit 13 as the reference picture.

The predicted picture generation unit 141 in the inter divided-picture predictive encoding unit 14 generates a predicted picture by applying, to the reference picture, a predetermined filter determined based on a relative position between corresponding pixels on the original picture of the divided picture which is a current encoding target and the reference picture.

Figure 3:
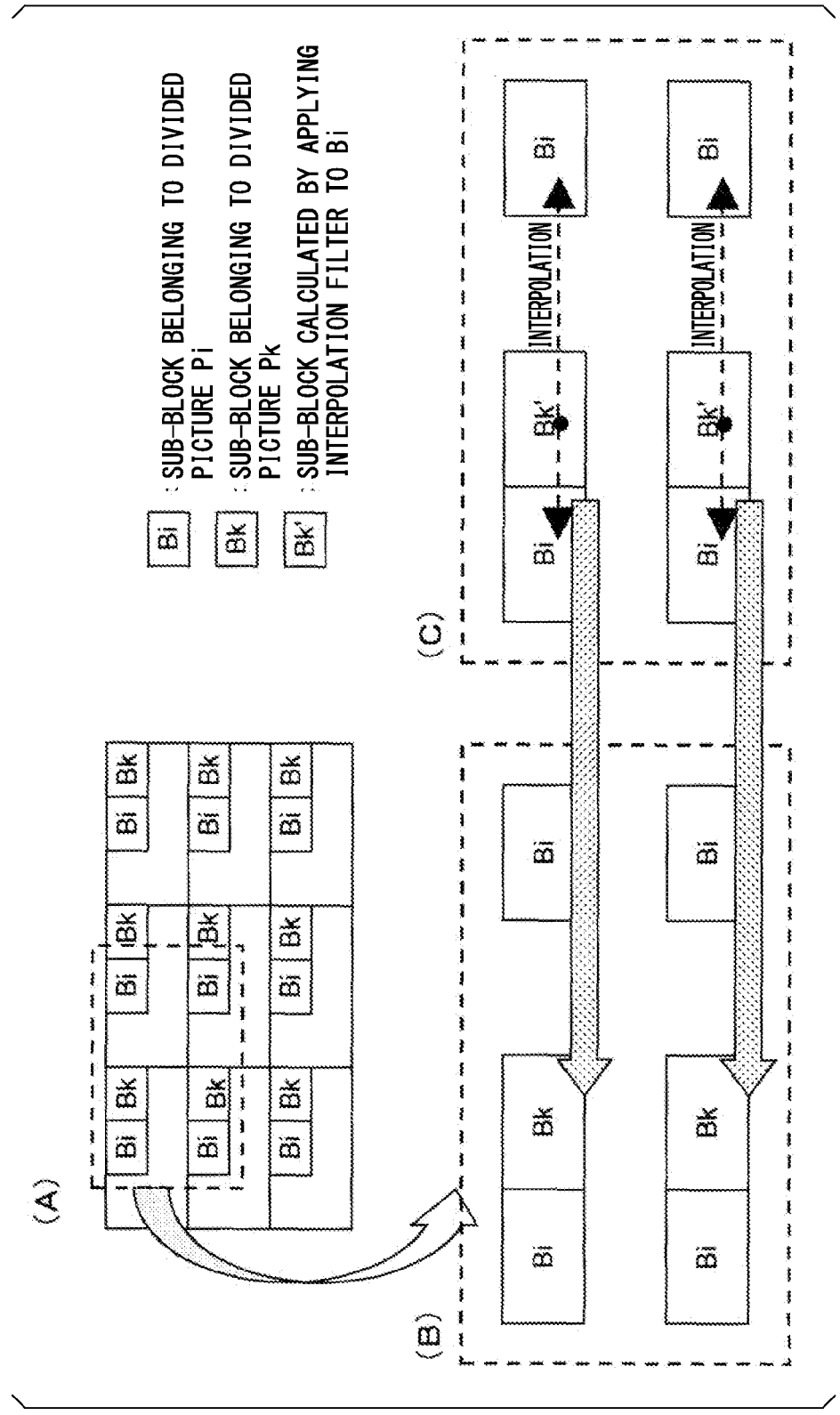
FIG. 3 is a diagram illustrating an example of generation of a predicted picture in a predicted picture generation unit.

FIG. 3 is a diagram illustrating an example in which the predicted picture is generated by the predicted picture generation unit 141. Hereinafter, an example in which a predicted picture is generated when a divided picture Pi is an encoded divided picture which is the reference picture and a divided picture Pk is an encoding target divided picture to be subjected to inter divided-picture predictive encoding will be described. A sub-block belonging to the divided picture Pi is indicated by Bi, and a sub-block belonging to the divided picture Pk is indicated by Bk.

Assuming that a positional relationship on the original picture between a sub-block Bi of the divided picture Pi and a sub-block Bk of the divided picture Pk is as illustrated in FIG. 3(A), sub-blocks Bi located around a sub-block Bk are extracted as illustrated in FIG. 3(B). In this example, two sub-blocks Bi are extracted for one sub-block Bk, but the present embodiment is not limited to two sub-blocks. Next, an interpolation filter is applied to pixel values of the two extracted sub-blocks Bi to calculate pixel values of a sub-block Bk', as illustrated in FIG. 3(C). For filter coefficients of the interpolation filter, filter coefficients determined in advance based on a relative position on the original picture between the sub-block Bi and the sub-block Bk are used. It is to be noted that various methods are conventionally known for the interpolation method based on an interpolation filter, and the reference picture may be generated using any interpolation method.

A set of sub-blocks Bk' generated through interpolation in this way is set as a predicted picture to be used for inter divided-picture predictive encoding of the divided picture Pk.

The prediction error calculation unit 142 subtracts each pixel value of the predicted picture generated by the predicted picture generation unit 141 from each pixel value of the divided picture which is a current encoding target to calculate a prediction error. The prediction error encoding unit 143 performs orthogonal transform and a quantization process on the calculated prediction error to encode the prediction error.

The information source encoding unit 15 performs entropy encoding on encoding information of the divided picture encoded by the intra divided-picture encoding unit 12 and the inter divided-picture predictive encoding unit 14 and outputs encoded data.

In order to utilize the divided picture encoded by the inter divided-picture predictive encoding unit 14 for generation of a predicted picture in encoding of another divided picture, the picture decoding unit 144 decodes the divided picture by adding the prediction error of the encoding result to the predicted picture used for prediction of the encoded divided picture, stores the decoded picture, and sends the decoded picture to the predicted picture generation unit 141. It is to be noted that when the prediction error encoding unit 143 orthogonally transforms and quantizes the prediction error, the picture decoding unit 144 performs inverse quantization and inverse orthogonal transform on an output of the prediction error encoding unit 143 and then performs addition of pixel values of the predicted picture to decode the divided picture.

[Flow of Picture Encoding Process]

Next, a flow of a picture encoding process will be described in accordance with a specific example.

Figure 4:
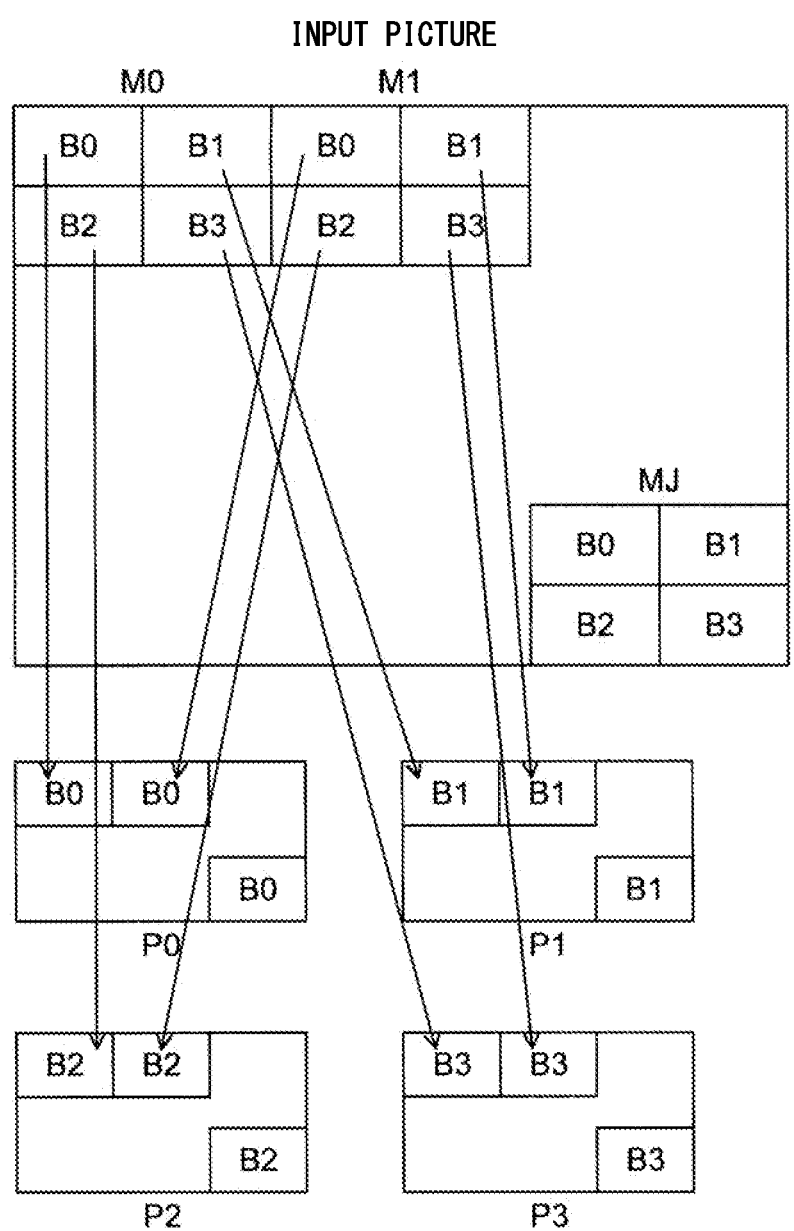
FIG. 4 is a diagram illustrating an example of division of an encoding target picture.

An example in which an encoding target picture is divided is illustrated in FIG. 4. In the example to be described hereinafter, the divided picture generation unit 11 divides one frame of an input picture which is an encoding target into blocks M0, M1, . . . , MJ of 2×2 pixels, as illustrated in FIG. 4. Furthermore, each of the blocks M0, M1, . . . , MJ is divided into sub-blocks B0, B1, B2, and B3 on a pixel-by-pixel basis. A set of pixels of the upper left sub-blocks B0 collected from M0, M1, . . . , MJ divided in this way is set as a divided picture P0, a set of pixels of upper right sub-blocks B1 is set as a divided picture P1, a set of pixels of lower left sub-blocks B2 is set as a divided picture P2, and a set of pixels of lower right sub-blocks B3 is set as a divided picture P3.

An example in which a block of 2×2 pixels is divided into sub-blocks of 1×1 pixels will be described herein. However, the size of the block and the size of the sub-block are not limited to those in this example, and the present invention may also be implemented similarly even when the present invention is applied to a case in which the size of the block or the size of the sub-block is greater.

Figure 5:
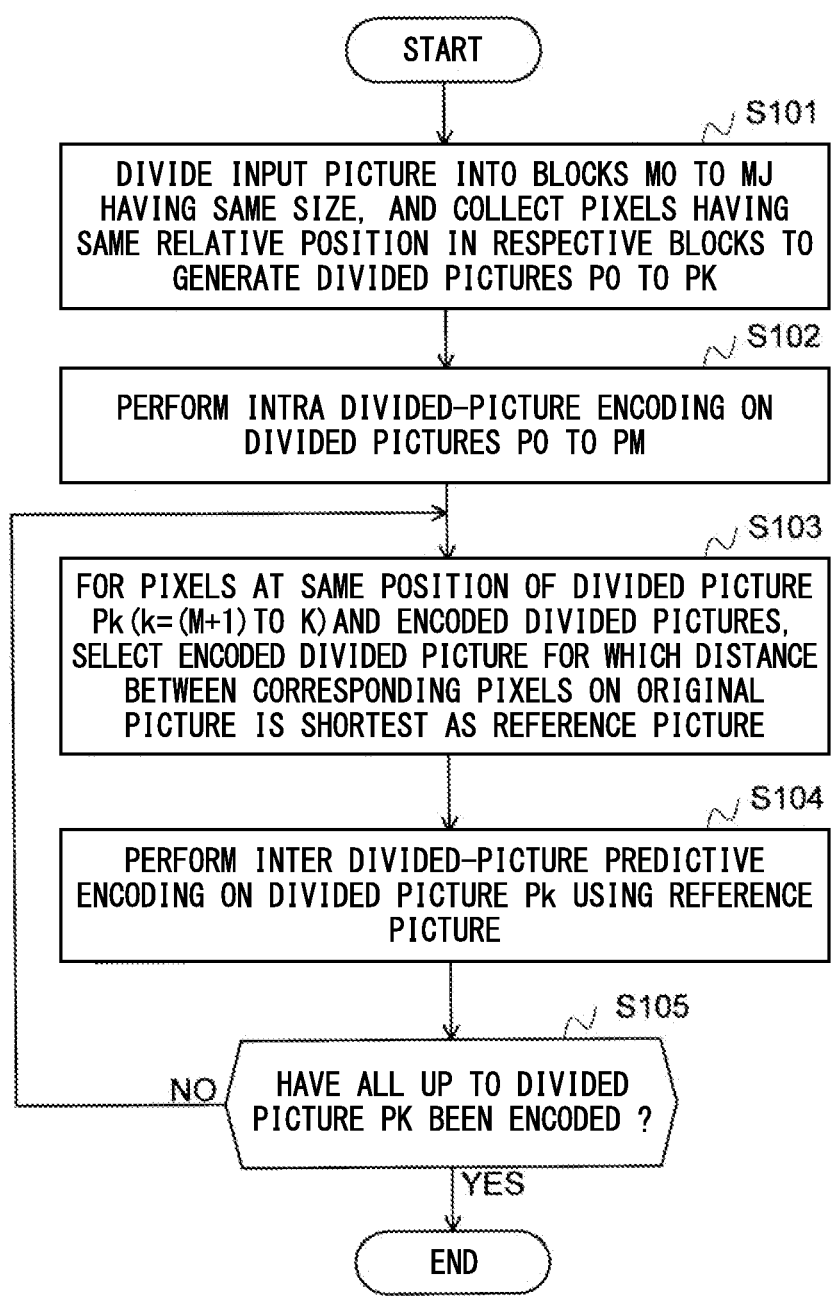
FIG. 5 is a flowchart of a picture encoding process.

FIG. 5 is a flowchart of the picture encoding process. First, the divided picture generation unit 11 divides an input picture into blocks M0 to MJ having the same size as illustrated in FIG. 4, and collects pixels (sub-blocks) having the same relative position in the blocks to generate divided pictures P0 to PK (step S101). It is to be noted that in the example of FIG. 4, K=3.

Then, the intra divided-picture encoding unit 12 performs the intra divided-picture encoding on some divided pictures P0 to PM (where M<K) among the divided pictures P0 to PK (step S102). In the example of FIG. 4, the intra divided-picture predictive encoding is performed on the divided picture P0 using, for example, a conventional intra-frame predictive encoding method.

Then, the reference picture selection unit 13 selects a reference picture in order to encode (M+1)-th and subsequent divided pictures Pk (in the example of FIG. 4, P1 to P3). In this selection of the reference picture, for pixels at the same position of a divided picture Pk of an encoding target and an encoded divided picture, the encoded divided picture for which distance between corresponding pixels on the original picture is shortest is selected (step S103). In the example of FIG. 4, assuming that encoding is performed in order of the divided pictures P0, P1, P2 and P3, the encoded divided picture P0 is selected as a reference picture for the divided picture P1, and the encoded divided picture P0 is also selected as a reference picture for the divided picture P2. As reference pictures for the divided picture P3, one or both of the divided picture P1 and the divided picture P2 are selected as the reference pictures.

Then, the inter divided-picture predictive encoding unit 14 performs inter divided-picture predictive encoding on the divided picture Pk of the encoding target (step S104). In this inter divided-picture predictive encoding, first, the predicted picture generation unit 141 reads the reference picture selected by the reference picture selection unit 13 from the picture decoding unit 144 and applies, to the reference picture, a predetermined filter determined based on the relative position on the original picture of the divided picture Pk to generate a predicted picture. The prediction error calculation unit 142 calculates an error between the divided picture Pk and the predicted picture. The prediction error encoding unit 143 encodes an output of the prediction error calculation unit 142 and sends to the picture decoding unit 144 and the information source encoding unit 15. The picture decoding unit 144 performs decoding on an encoding result of the prediction error encoding unit 143 so that the encoded divided picture Pk can be used for subsequent inter divided-picture predictive encoding. The information source encoding unit 15 performs entropy encoding on the encoding result of the prediction error encoding unit 143.

The encoding of the divided picture Pk in steps S103 and S104 described above is repeated up to the last divided picture PK, and when the encoding is completed for all up to the last divided picture PK, the encoding of the current input picture (frame) ends (step S105).

Figure 6:
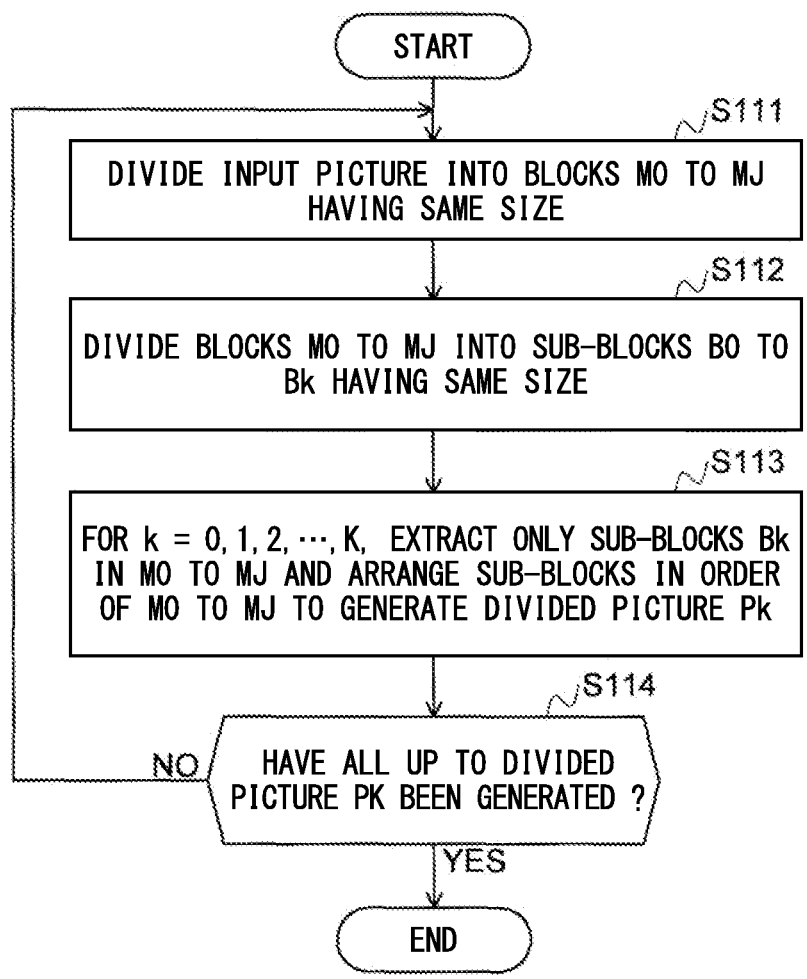
FIG. 6 is a flowchart of a divided picture generation process.

FIG. 6 is a flowchart of the divided picture generation process (step S101 of FIG. 5). The divided picture generation unit 11 divides an input picture into blocks Mj (j=0, 1, . . . , J) having the same size (step S111). The divided picture generation unit 11 then divides each block Mj into sub-blocks Bk (k=0, 1, . . . , K) having the same size (step S112). The divided picture generation unit 11 then extracts only sub-blocks Bk having the same relative position in the blocks M0 to MJ for k=0, 1, . . . , K, and arranges the sub-blocks in order of the blocks M0 to MJ to generate a divided picture Pk (step S113). The process described above is repeated until generation of the last divided picture PK ends (step S114).

In step S104 of FIG. 5, the predicted picture generation unit 141 applies an interpolation filter determined based on a pixel position of the divided picture Pi on the original picture to the divided picture Pi which is the reference picture, and generates a predicted picture Pk' to be used for encoding a prediction error of the divided picture Pk.

For example, assuming that the encoding is performed in order of the divided pictures P0, P1, P2, and P3 in encoding the input picture illustrated in FIG. 4, first, the divided picture P0 is subjected to intra divided-picture encoding in step S102 of FIG. 5, and then the divided picture P0 is selected as a reference picture in step S103 of FIG. 5 when the divided picture P1 is encoded. Then, in step S104, in order to encode the divided picture P1, an interpolation filter is applied to the encoded divided picture P0 which is the reference picture to generate a predicted picture P1' of the divided picture P1. For this interpolation filter, for example, a 6-tap finite impulse response (FIR) filter used for generation of a predicted signal of ½ pixel precision in motion compensation prediction of H.264 may be used.

Figure 7:
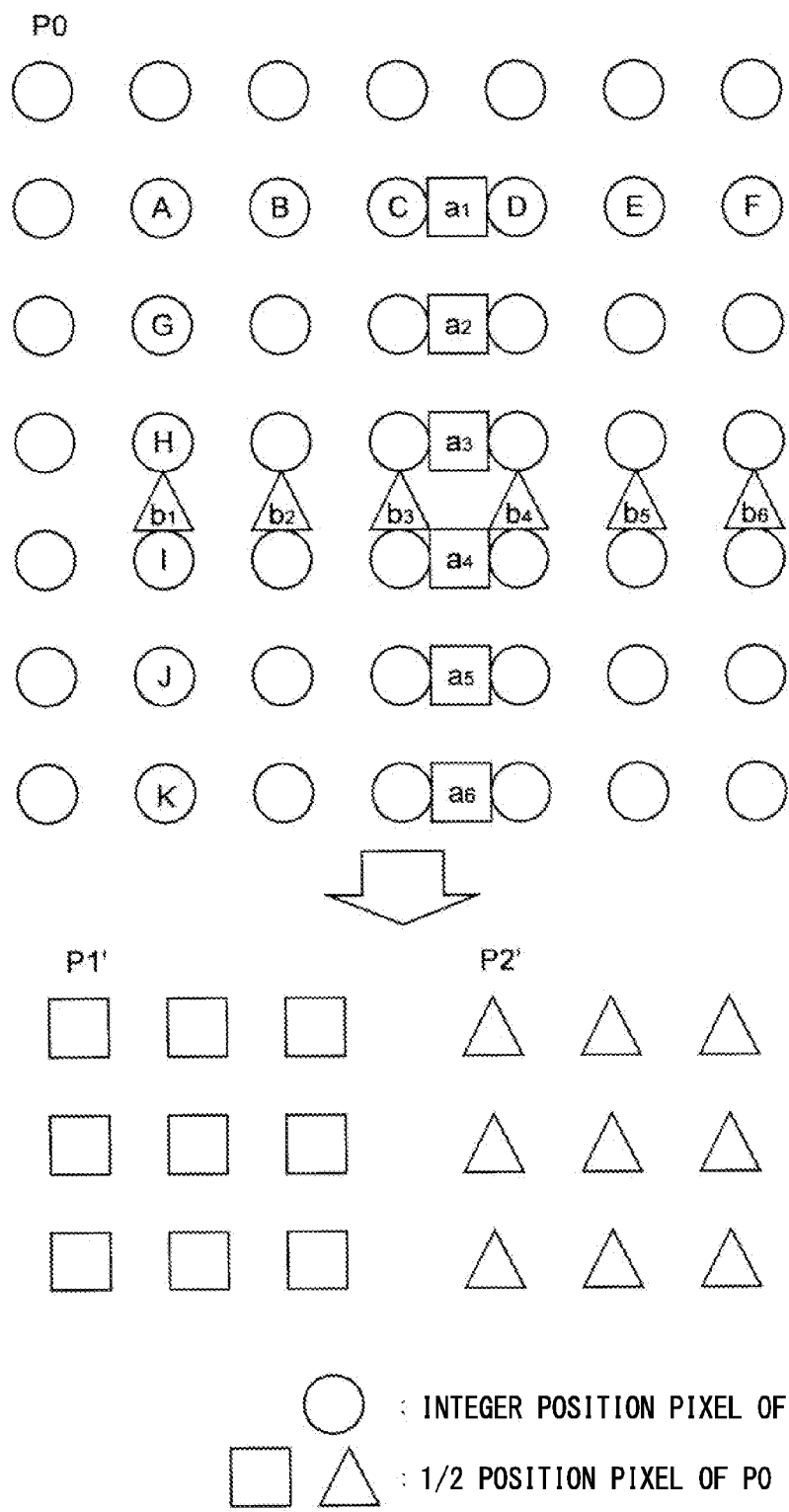
FIG. 7 is a diagram illustrating an example in which an interpolation filter is applied.

FIG. 7 is a diagram illustrating an example in which the interpolation filter is applied. In FIG. 7, pixels indicated by ○ are integer position pixels of the divided picture P0. Pixels indicated by □ and Δ are ½ position pixels of the divided picture P0. A predicted picture P1' in which the divided picture P0 is used as a reference picture is calculated as ½ position pixels of P0 indicated by □ in FIG. 7 by applying a horizontal half-pixel filter as shown in the following equation to pixels A, B, C, D, E, and F of the encoded picture of P0.

$$a_1 = \frac{1}{32}\{A - 5B + 20C + 20D - 5E + F\}$$

($a_2$, $a_3$, . . . are the same as $a_1$)

In encoding of the divided picture P2, the divided picture P0 having the shortest distance among the encoded divided pictures P0 and P1 is selected as a reference picture, and an interpolation filter of a vertical half-pixel filter is applied to the divided picture P0 to generate a predicted picture P2'. This predicted picture P2' is calculated as ½ position pixels of P0 illustrated by Δ in FIG. 7 by applying a vertical half-pixel filter as shown in the following equation to pixels A, G, H, I, J, and K of the encoded picture of P0

$$b_1 = \frac{1}{32}\{A - 5G + 20H + 20I - 5J + K\}$$

($b_2$, $b_3$, . . . are the same as $b_1$)

In encoding the next divided picture P3, the two divided pictures P1 and P2 among the encoded divided pictures P0, P1, and P2 have the shortest distance. One of them may be used as a reference picture or both may be used as reference pictures to obtain a predicted picture P3' of the divided picture P3. A process in which only one of the divided pictures P1 and P2 is used as a reference picture is similar to generation of the predicted pictures of the divided pictures P1 and P2 described above. Next, an example in which a plurality of reference pictures are used will be described.

[Example Using Reference List]

The reference picture selection unit 13 described above may select a plurality of reference pictures instead of selecting one reference picture. In this case, data indicating the plurality of selected reference pictures is generated and held as a reference list.

When it is necessary to communicate which reference picture in the reference list has been used for generation of a predicted picture to the decoding end, a reference picture index is encoded and reported to the decoding end. The reference picture index is data indicating the order of a reference picture in the reference list, and since there is a high probability that the reference picture near the top in the reference list is used for generation of the predicted picture, a short code length is assigned thereto.

The maximum number of reference pictures may be set to be equal in the encoding end and the decoding end in advance, or it may be notified from the encoding end to the decoding end using, for example, header information of an encoded stream.

[Flow of Picture Encoding Process Using Reference List]

Figure 8:
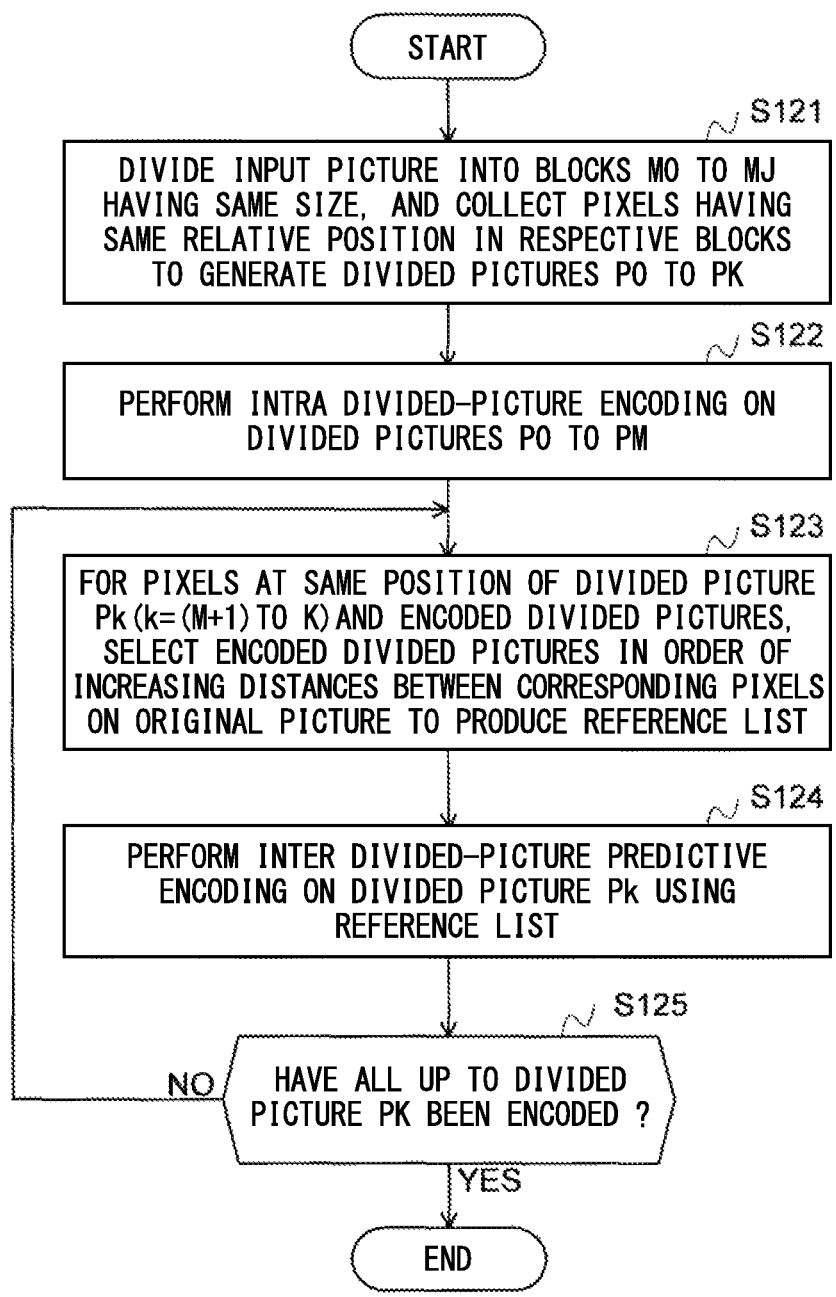
FIG. 8 is a flowchart of a picture encoding process when a reference list is used.

FIG. 8 is a flowchart of a picture encoding process when a reference list is used. A process of steps S121 and S122 is the same as the process of steps S101 and S102 of FIG. 5 described above.

In subsequent step S123, the reference picture selection unit 13 selects reference pictures in order to perform inter divided-picture predictive encoding on (M+1)-th and subsequent divided pictures Pk. In this selection of the reference pictures, for pixels at the same position of the encoding target divided picture Pk and encoded divided pictures, encoded divided pictures are selected in order of increasing distances between corresponding pixels on the original picture to produce a reference list.

Next, in step S124, the inter divided-picture predictive encoding unit 14 performs inter divided-picture predictive encoding on the encoding target divided picture Pk using one or a plurality of reference pictures indicated by the reference list. Then, encoding of the next divided picture Pk in steps S123 and S124 is repeated up to the last divided picture PK, and when encoding is completed all up to the last divided picture PK, encoding of the current input picture (frame) ends (step S125).

An example of a case in which the reference list is used in the example of the input picture of FIG. 4 will be described. It is assumed that encoding is performed in order of the divided pictures P0, P1, P2, and P3. Since the divided picture P0 is to be subjected to intra divided-picture encoding, no reference picture is used. In encoding of the next divided picture P1, the reference picture is only the divided picture P0 and the number of reference pictures is 1.

In encoding of the next divided picture P2, the encoded divided pictures are two of P0 and P1, but since the positions of pixels of the divided picture P0 among those of P0 and P1 are close to P2, only the divided picture P0 is stored in the reference list or the divided pictures P0 and P1 are stored in order of the divided pictures P0 and P1.

In encoding of the divided picture P3, the divided pictures P0, P1, and P2 are considered as reference pictures. Among these, the divided pictures whose positions of the pixels are nearest to the divided picture P3 are P1 and P2. When there are a plurality of divided pictures having the same distance, priority orders for storage in the reference list is determined in accordance with a predetermined reference list generation rule. As a result, one of the following reference lists is used as a reference list for the divided picture P3.

{P1, P2}, {P2, P1}, {P1, P2, P0}, {P2, P1, P0}

Furthermore, a picture obtained by combining predicted pictures generated from a plurality of reference pictures may be added to the reference list. For example, an average picture of predicted pictures P3' and P3" of the divided picture P3 which are respectively generated from the encoded divided pictures P1 and P2 may be added as the reference picture to the reference list. When this average picture is indicated by Px, the reference list is, for example, as follows.

{P1, P2, Px}, {P2, P1, Px}, . . . .

Figure 9A:
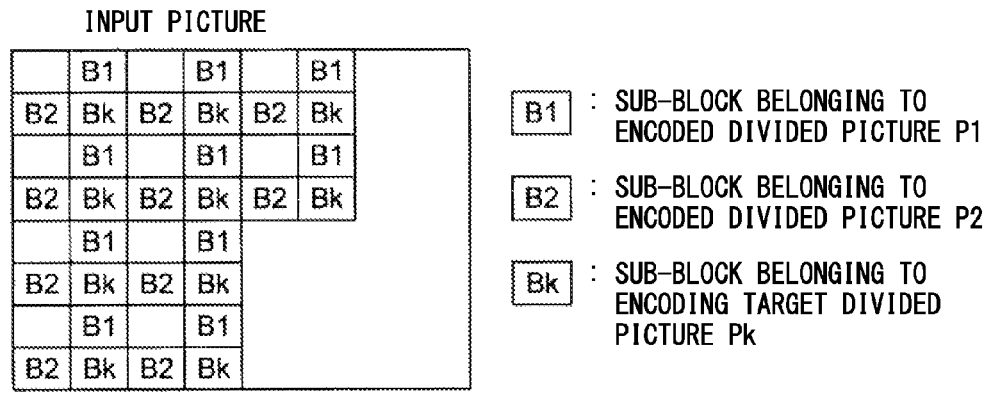
FIG. 9A is a diagram illustrating an example of combining predicted pictures.
Figure 9B:
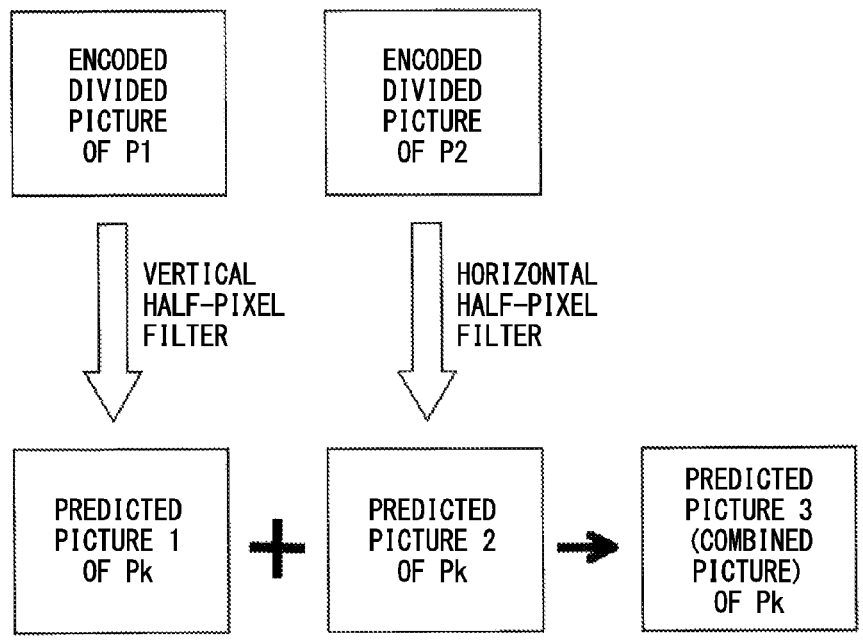
FIG. 9B is a diagram illustrating an example of combining predicted pictures.

An example of combining predicted pictures is illustrated in FIGS. 9A and 9B. In an input picture illustrated in FIG. 9A, B1 is a sub-block belonging to the encoded divided picture P1, B2 is a sub-block belonging to the encoded divided picture P2, and Bk is a sub-block belonging to the encoded divided picture Pk. In this example, the size of the sub-block is a 1×1 pixel. The divided picture P1 is a set of sub-blocks of B1, the divided picture P2 is a set of sub-blocks of B2, and the divided picture Pk is a set of sub-blocks of Bk.

One predicted picture 1 of Pk is generated by applying a vertical half-pixel filter to the encoded divided picture of P1, as illustrated in FIG. 9B. Furthermore, another predicted picture 2 of Pk is generated by applying a horizontal half-pixel filter to the encoded divided picture of P2. A picture obtained by combining these is set as a predicted picture 3 of Pk. As a combining method, for example, the average of pixels is calculated. In other words, a pixel value in the following equation is calculated.

(Pixel value at position$(i,j)$ of predicted picture 3 of $Pk$)={(Pixel value at position$(i,j)$ of predicted picture 1 of $Pk$)+(Pixel value at position$(i,j)$ of predicted picture 2 of $Pk$)}/2

Another example obtained by generalizing the example in which the combined picture is added as the reference picture will be described. For reference pictures R up to the N-th reference picture on the reference list produced from existing encoded divided pictures (referred to as an original reference list), $k_1^{th}$ and $k_2^{th}$ reference pictures among them are selected and an average picture of predicted pictures thereof is generated. It is not necessary for the distances on the original picture between the $k_1^{th}$ and $k_2^{th}$ reference pictures and pixel positions of an encoding target divided picture to be the same.

This average picture is arranged next to the $k_2^{th}$ picture of the original reference list on a new reference list in order of increasing values of $k_1$. When the predicted picture of the average picture obtained from the reference pictures of $k_1$ and $k_2$ is conveniently expressed as $(k_1+k_2)/2$, the new reference list obtained from the original reference list is as follows.

Original Reference List
1, 2, 3, 4, . . . , N
New Reference List
1, 2, (1+2)/2, 3, (1+3)/2, (2+3)/2, 4, (1+4)/2, (2+4)/2, . . . , N In an embodiment in which, when the reference list in which the plurality of reference pictures are designated as described above is given, a reference picture in the reference list to be used for generation of a predicted picture to be used for actual encoding is adaptively determined, the inter divided-picture predictive encoding unit 14 may calculate, for example, rate distortion costs (referred to as RD costs) and use a reference picture having the smallest RD cost in the reference list.

An RD cost is defined by the following equation. Here, D denotes an amount of distortion, R denotes an amount of generated bits, and λ denotes a Lagrange multiplier.

RD cost=$D+\lambda R$

When the reference picture whose RD cost is minimized in encoding is determined, a reference picture index indicating a used reference picture in the reference list is encoded and reported to the decoding end. Furthermore, a combined picture use ON/OFF flag indicating whether the combined picture described above is to be used as the reference picture may be encoded for each divided picture and reported to the decoding end. In addition, as a method for designating the combined picture, a method for notifying the decoding end of the fact that two reference pictures are combined and used may be used by, for example, using a method for selecting two reference pictures and designating a combining method with a macroblock syntax, as in picture B of H.264.

Methods for sharing the reference list between the encoding end and the decoding end include, for example, the following methods.

(1) A fixed reference list determined in advance is used for each encoding target divided picture.

(2) Information indicating a reference list generation rule used for generation of the reference list at the time of encoding on the encoding end among some reference list generation rules determined in advance is encoded and sent to the decoding end. On the decoding end, decoding is performed on encoded data of the reference list generation rule and a reference list is generated in accordance with the same reference list generation rule.

An order of arranging reference pictures in the reference list is basically an order of encoded divided pictures having increasing distances on the original picture for pixels at same position in an encoding target divided picture and encoded divided pictures. However, for example, when there are a plurality of encoded divided pictures having the same distance, the divided picture to be preferentially arranged in the reference list is determined using the reference list generation rule.

The reference list generation rule is a rule which determines an encoded divided picture to be arranged in an upper position of the reference list, for example, in the following cases.

[Rule 1]: When there are a plurality of candidates of reference pictures having the same distance, a divided picture for which intra divided picture encoding has been completed is preferential to a divided picture for which inter divided-picture predictive encoding has been completed.

[Rule 2]: When there are a plurality of candidates of reference pictures having the same distance, a divided picture having high quantization precision is preferential.

[Rule 3]: When there are a plurality of candidates of reference pictures having the same distance, an encoded divided picture whose encoding order is later is preferential.

[Rule 4]: A rule which is a combination of some of Rules 1 to 3.

[Flowchart 1 of Reference List Generation Process]

Figure 10:
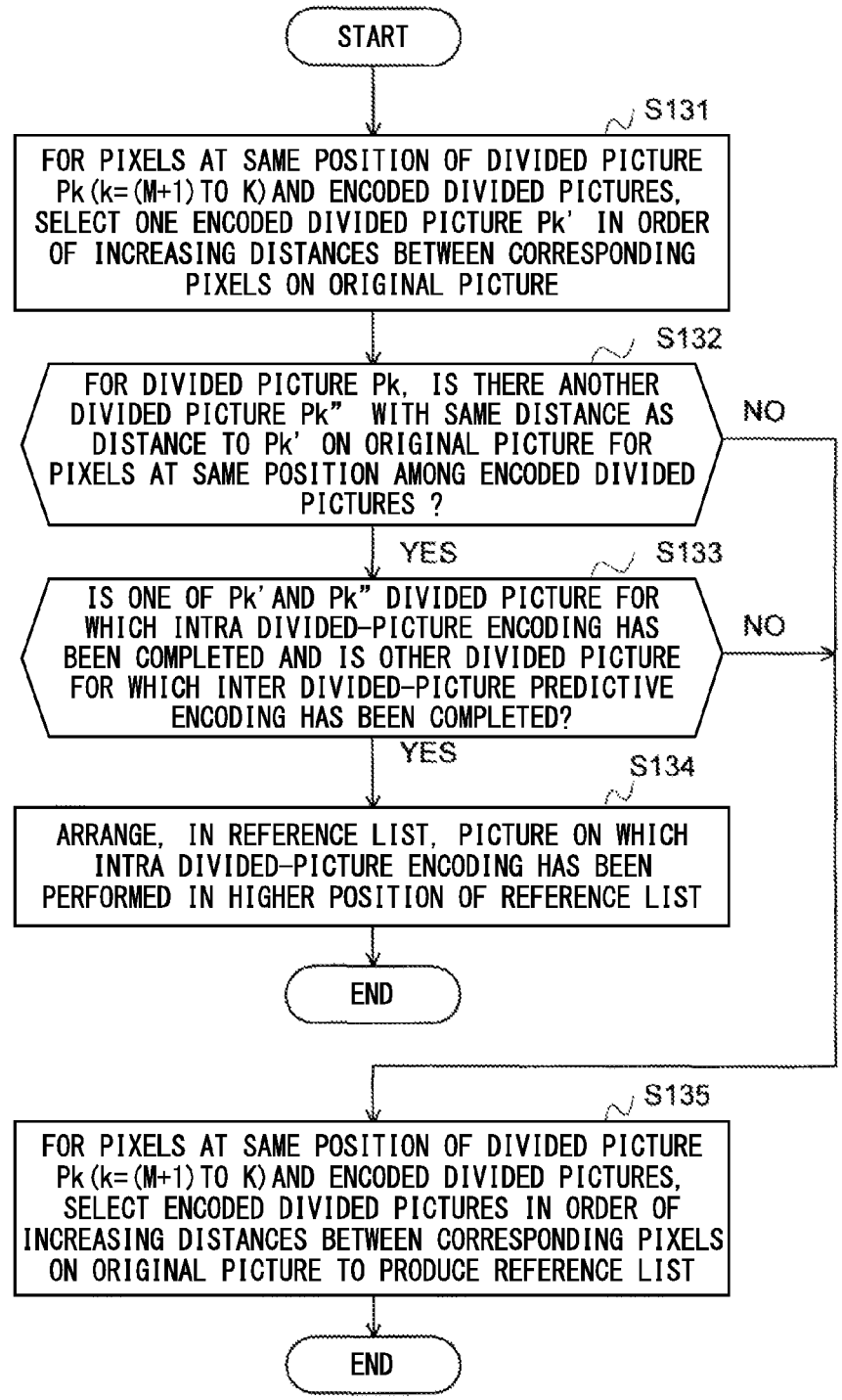
FIG. 10 is a flowchart illustrating Example 1 of a process of generating a reference list.

FIG. 10 is a flowchart illustrating an example of a process of generating a reference list in accordance with Rule 1. First, in step S131, for pixels at the same position of an encoding target divided picture Pk and an encoded divided picture, one encoded divided picture Pk' is selected in order of increasing distances between corresponding pixels on an original picture.

Then, in step S132, a determination is made as to whether there is another divided picture Pk" having the same distance to the divided picture Pk as the distance between Pk' and the divided picture Pk on the original picture for the same pixel among the encoded divided pictures. If there is no other divided picture having the same distance, the process proceeds to step S135. If there is another divided picture having the same distance, the process proceeds to step S133 to determine whether one of the encoded divided pictures Pk' and Pk" is a divided picture for which intra divided-picture encoding has been completed and the other is a divided picture for which inter divided-picture predictive encoding has been completed. If a determination result is "true", the process proceeds to step S134 and if the determination result is "false", the process proceeds to step S135.

In step S134, the encoded divided picture for which intra divided picture encoding has been performed is arranged in a higher position of the reference list, and then the encoded divided picture for which inter divided-picture predictive encoding has been performed is arranged in the reference list.

On the other hand, in step S135, for pixels at the same position of the divided picture Pk and the encoded divided pictures, encoded divided pictures are selected in order of increasing distances between corresponding pixels on the original picture to produce a reference list.

[Flowchart 2 of Reference List Generation Process]

Figure 11:
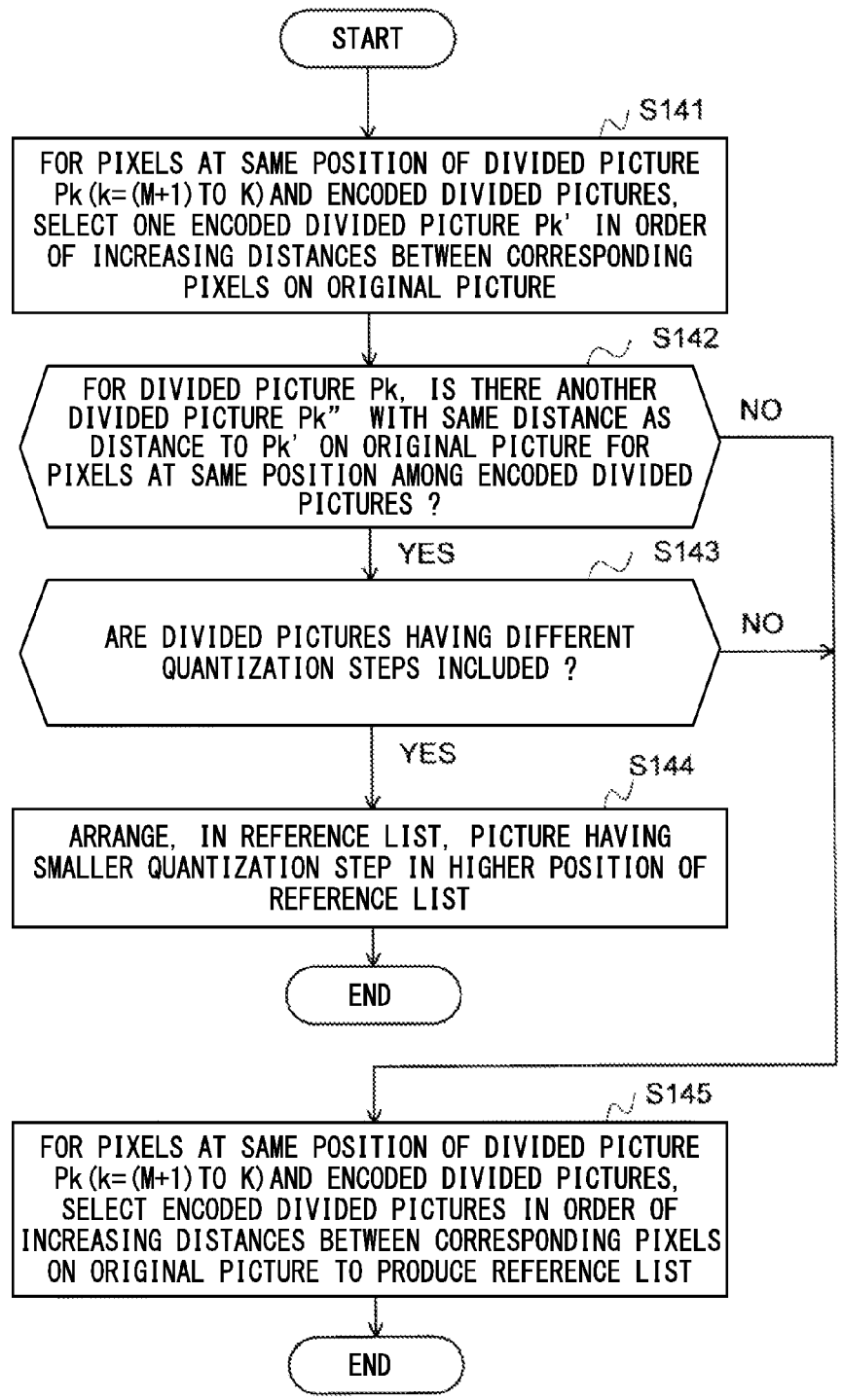
FIG. 11 is a flowchart illustrating Example 2 of a process of generating a reference list.

FIG. 11 is a flowchart illustrating an example of a process of generating a reference list in accordance with Rule 2. Since this example is different in steps S143 and S144 from the example of FIG. 10 described above, only these steps will be described and a description of the other steps is omitted.

When a reference list is generated in accordance with Rule 2, if there is another divided picture Pk" having the same distance as the distance to Pk' on the original picture for the same pixel among the encoded divided pictures, it is determined in step S143 whether quantization steps at the time of encoding of the divided pictures Pk' and Pk" are different from each other. The process proceeds to step S144 if a determination result is "true", and the process proceeds to step S145 if the determination result is "false".

In step S144, an encoded divided picture having a smaller quantization step is arranged in a higher position of the reference list, and then an encoded divided picture having a larger quantization step is arranged in the reference list. This is because a picture having high quantization precision is generally appropriate as a reference picture.

In step S145, for pixels at the same position of the divided picture Pk and the encoded divided pictures, encoded divided pictures are selected in order of increasing distances between corresponding pixels on the original picture to produce a reference list, similar to step S135 described above.

[Flowchart 3 of Reference List Generation Process]

Figure 12:
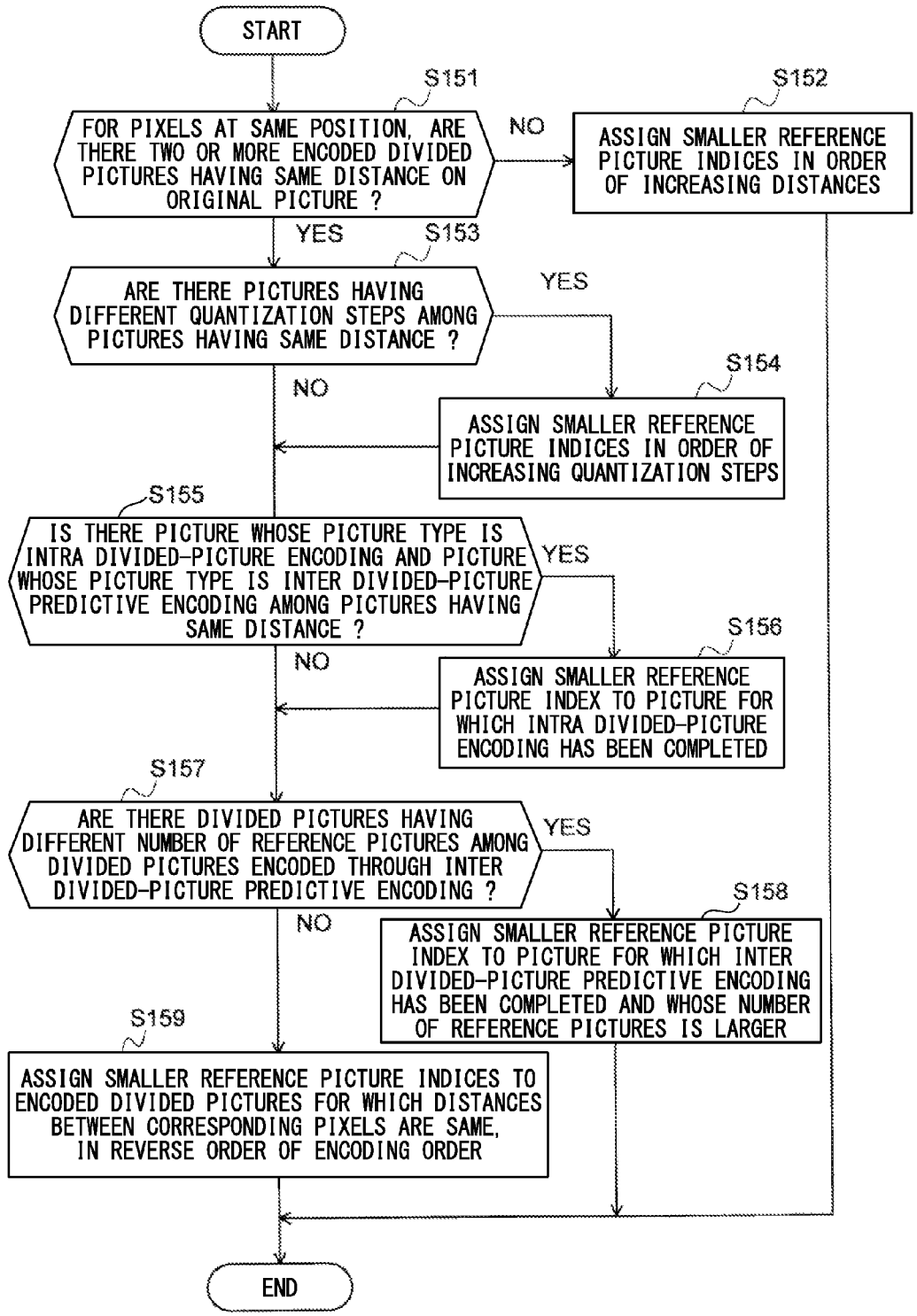
FIG. 12 is a flowchart illustrating Example 3 of a process of generating a reference list.

FIG. 12 is a flowchart illustrating an example of a process of generating a reference list in accordance with Rule 4. First, it is determined in step S151 whether, for pixels at the same position of the encoding target divided picture Pk and the encoded divided pictures, there are two or more encoded divided pictures having the same distance between corresponding pixels on the original picture. If a determination result is "true", the process proceeds to step S153. If the determination result is "false", the process proceeds to step S152 to assign increasing reference picture indices in order of increasing distances, produce a reference list in order of the reference picture indices, and end the reference list generation process.

In step S153, it is determined whether there are encoded divided pictures having different quantization steps among the encoded divided pictures having the same distance. If a determination result is "false", the process proceeds to step S155. If the determination result is "true", the process proceeds to step S154 to assign increasing reference picture indices in order of increasing quantization steps and proceed to step S155.

In step S155, it is determined whether there is an encoded divided picture whose picture type is intra divided-picture encoding and an encoded divided picture whose picture type is inter divided-picture predictive encoding among the encoded divided pictures having the same distance. If a determination result is "false", the process proceeds to step S157. If the determination result is "true", the process proceeds to step S156 to assign a smaller reference picture index to a divided picture for which intra divided-picture encoding has been completed than that of a divided picture for which inter divided-picture predictive encoding has been completed, and proceeds to step S157.

In step S157, it is determined whether there are divided pictures having different numbers of reference pictures among divided pictures encoded through inter divided-picture predictive encoding. If a determination result is "false", the process proceeds to step S159. If the determination result is "true", the process proceeds to step S158 to assign a smaller reference picture index to the divided picture for which inter divided-picture predictive encoding has been completed and whose number of reference pictures is larger, produce a reference list in order of reference picture indices, and end the process.

In step S159, increasing reference picture indices are assigned to the encoded divided pictures whose distances between corresponding pixels are the same in the reverse order of the encoding order, a reference list is produced in order of the reference picture indices, and the process ends.

In the flowchart illustrated in FIG. 12, the determination order of the quantization step, the picture type, or the like may be changed, and a rule which determines the reference picture indices using only some of the determination schemes may be used.

[Picture Decoding Apparatus]

Figure 13:
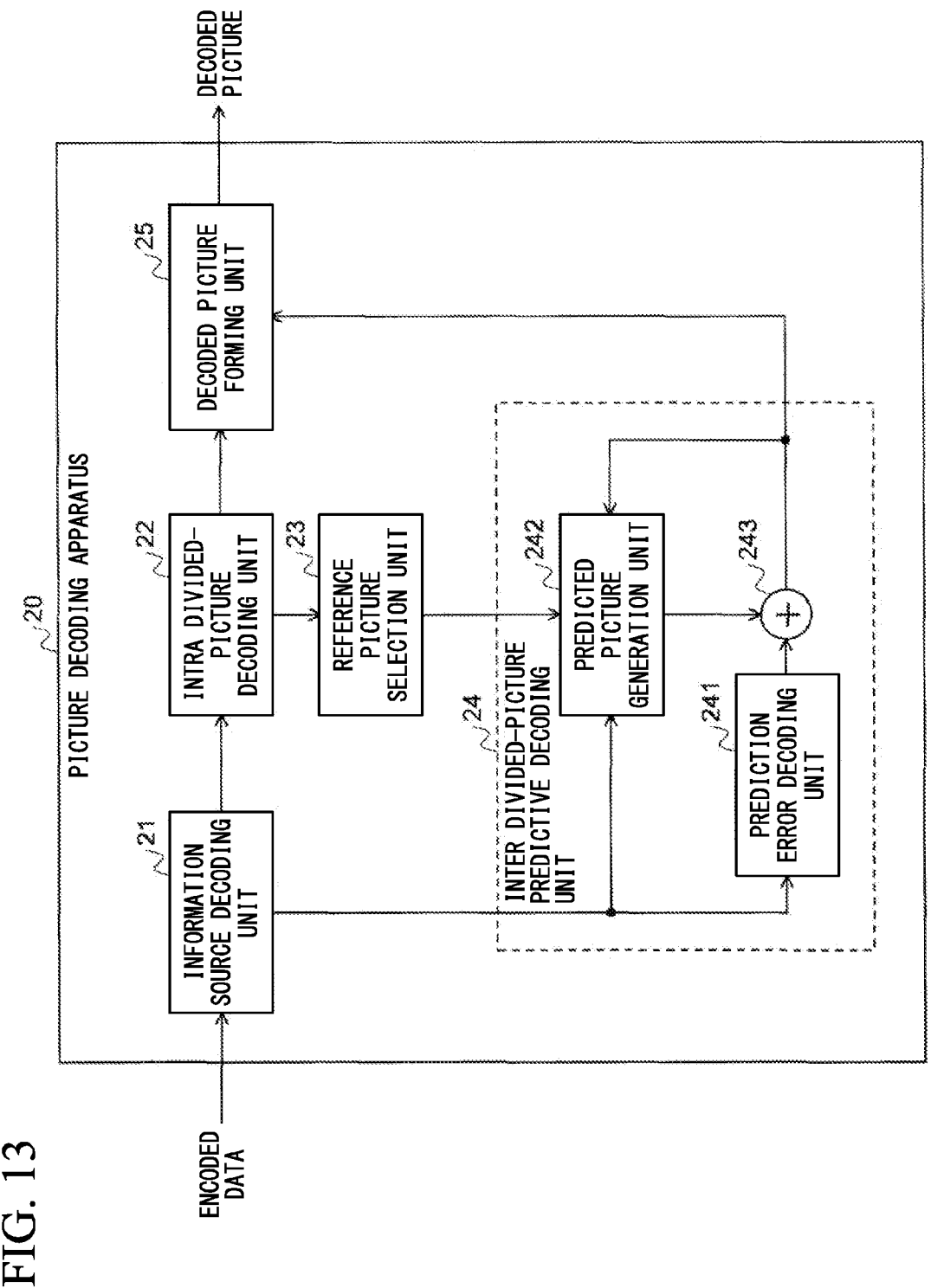
FIG. 13 is a diagram illustrating an example of a configuration of a picture decoding apparatus.

FIG. 13 is a diagram illustrating an example of a configuration of a picture decoding apparatus. A picture decoding apparatus 20 includes an information source decoding unit 21, an intra divided-picture decoding unit 22, a reference picture selection unit 23, an inter divided-picture predictive decoding unit 24, and a decoded picture forming unit 25. The inter divided-picture predictive decoding unit 24 includes a prediction error decoding unit 241, a predicted picture generation unit 242, and a decoded picture calculation unit 243.

In the picture decoding apparatus 20, the information source decoding unit 21 inputs encoded data of the picture subjected to compression encoding by the picture encoding apparatus 10 illustrated in FIG. 1 and performs entropy decoding on the input encoded data.

The intra divided-picture decoding unit 22 performs decoding on the encoded data of at least one divided picture subjected to intra divided-picture encoding, through intra divided-picture prediction. The reference picture selection unit 23 selects a reference picture for decoding the divided picture subjected to inter divided-picture predictive encoding.

As a scheme of selecting the reference picture, there is a case using a reference list and a case using no reference list. When there is only one reference picture, it is not necessary to use the reference list. An important point is to use, as a reference picture on the decoding end, the same divided picture as the reference picture used at the time of encoding by inter divided-picture predictive encoding on the encoding end.

For example, when there is only one reference picture and the reference picture is selected on the encoding end in order of, for example, the distances between pixels, the picture types (intra divided-picture encoding and inter divided-picture predictive encoding), the quantization precision, and the encoding order, the decoding end selects a reference picture from among the decoded divided pictures in the same order. If this scheme of selecting the reference picture has been encoded, the same selection scheme as that on the encoding end is used on the decoding end by performing decoding on encoded data thereof in advance.

When the reference picture selection scheme has been determined in advance, a fixed reference picture selection scheme may be shared between the encoding end and the decoding end; in this case, the decoding of the selection scheme is not necessary.

Furthermore, when there are a plurality of reference pictures and a reference list is used, the same reference list as that on the encoding end is also used on the decoding end. As this method, a method for determining a fixed reference list generation rule in advance and generating the same reference list using a common reference list generation rule in the encoding end and the decoding end may be used.

Furthermore, when the reference list generation rule has been encoded, the decoding end can generate a reference list using the same reference list generation rule as that of the encoding end by performing decoding on encoded data thereof in advance. Furthermore, if a flag indicating whether or not a combined picture is used as the reference picture has been encoded, the flag is decoded and it is determined whether the combined picture is to be added to the reference list.

Furthermore, when a reference picture index designating the reference picture has been encoded, the reference picture index is decoded and a picture in the reference list designated by the reference picture index is selected as the reference picture.

The inter divided-picture predictive decoding unit 24 performs inter divided-picture predictive decoding on the divided pictures other than the divided picture subjected to intra divided-picture decoding. To this end, the prediction error decoding unit 241 of the inter divided-picture predictive decoding unit 24 performs inverse quantization, inverse orthogonal transform, and the like, as necessary, to decode the prediction error. The predicted picture generation unit 242 generates a predicted picture by applying, to the decoded divided picture, a predetermined filter determined based on a relative position on the original picture between the decoding target divided picture and the decoded divided picture (the reference picture), from one or a plurality of reference pictures selected by the reference picture selection unit 23. Here, when the combined picture is used, the average picture of a plurality of predicted pictures, or the like is set as a predicted picture.

The decoded picture calculation unit 243 calculates a pixel value of the decoded picture by adding a pixel value of the predicted picture generated by the predicted picture generation unit 242 to an output of the prediction error decoding unit 241.

The decoded picture forming unit 25 generates a decoded picture by arranging, at an original position on the original picture, each of sub-blocks of the divided pictures decoded by the intra divided-picture decoding unit 22 and the inter divided-picture predictive decoding unit 24.

[Flow of Example 1 of Picture Decoding Process]

Figure 14:
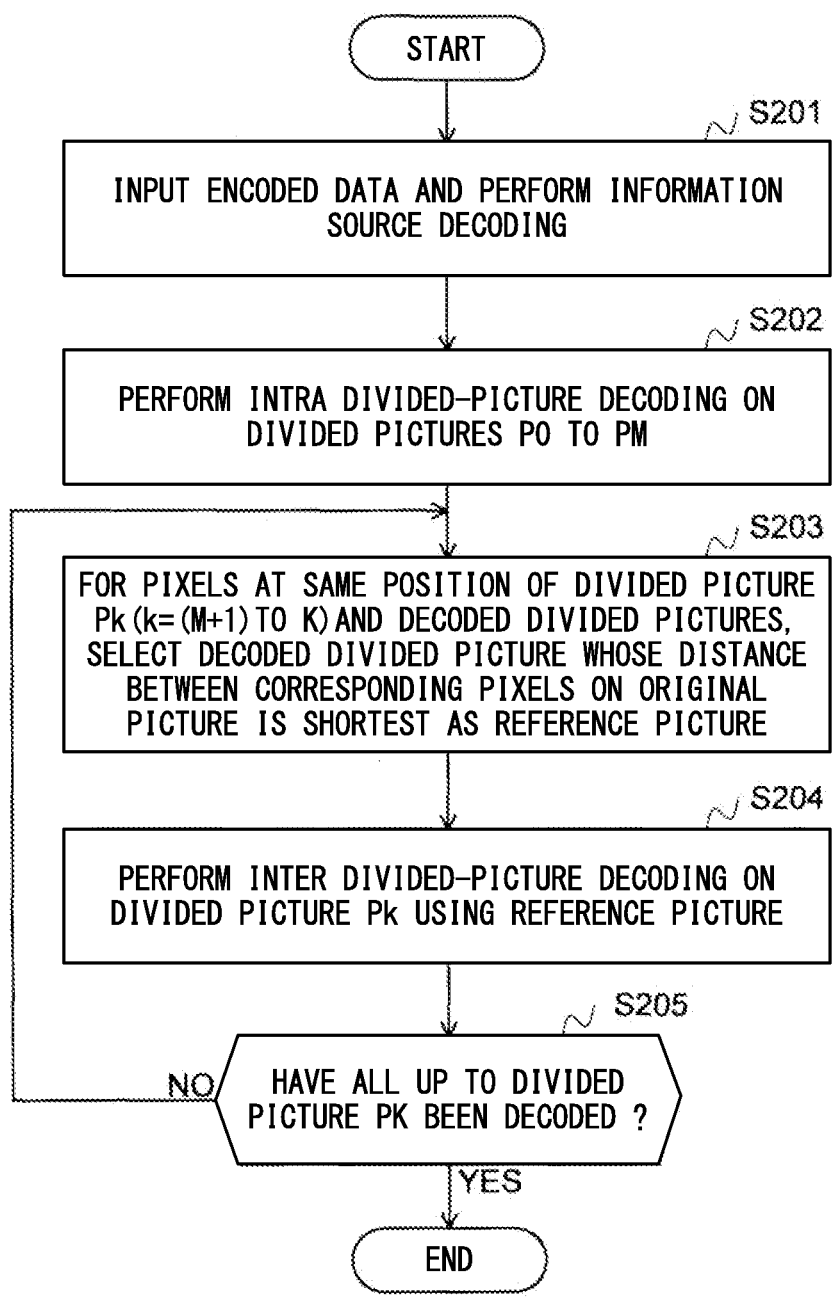
FIG. 14 is a flowchart of a picture decoding process.

FIG. 14 is a flowchart of Example 1 of the picture decoding process. An example of a case in which decoding is performed on data obtained by dividing and encoding the input picture on the encoding end as illustrated in FIGS. 2A to 2D will be described herein. It is assumed that the encoding end divides an input picture into blocks M0 to MJ having the same size, collects pixels (sub-blocks) having the same relative position in the blocks to generate divided pictures P0 to PK, encodes the divided pictures P0 to PM (0≤M<K) through intra divided-picture encoding, and encodes the divided pictures Pk (k=(M+1) to K) through inter divided-picture predictive encoding in units of divided pictures, as described above.

In the picture decoding apparatus 20, when encoded data is input by the information source decoding unit 21, the information source decoding unit 21 performs entropy decoding on the encoded data (step S201). Then, the intra divided-picture decoding unit 22 performs intra divided-picture decoding on the encoded data of the divided pictures P0 to PM using a method such as a conventional intra predictive decoding method (step S202).

Subsequently, the reference picture selection unit 23 selects a reference picture for decoding the divided pictures Pk (k=(M+1) to K) subjected to inter divided-picture predictive encoding. Here, for pixels at the same position of the decoding target divided picture Pk and the decoded divided picture, a decoded divided picture whose distance between corresponding pixels on the original picture is shortest is selected as the reference picture (step S203).

Next, the inter divided-picture predictive decoding unit 24 performs, on the divided picture Pk, inter divided-picture decoding by applying a predetermined interpolation filter determined based on the relative position on the original picture to the reference picture to generate a predicted picture and adding a pixel value of the predicted picture to the prediction error decoded by the prediction error decoding unit 241 (step S204).

Decoding of the divided picture Pk in steps S203 and S204 described above is repeated up to the last divided picture PK, and when decoding all up to the last divided picture PK ends, the decoded picture forming unit 25 generates the entire decoded picture from the decoded divided pictures P0 to PK, and the process of decoding one frame ends (step S205).

[Flow of Example 2 of Picture Decoding Process]

Figure 15:
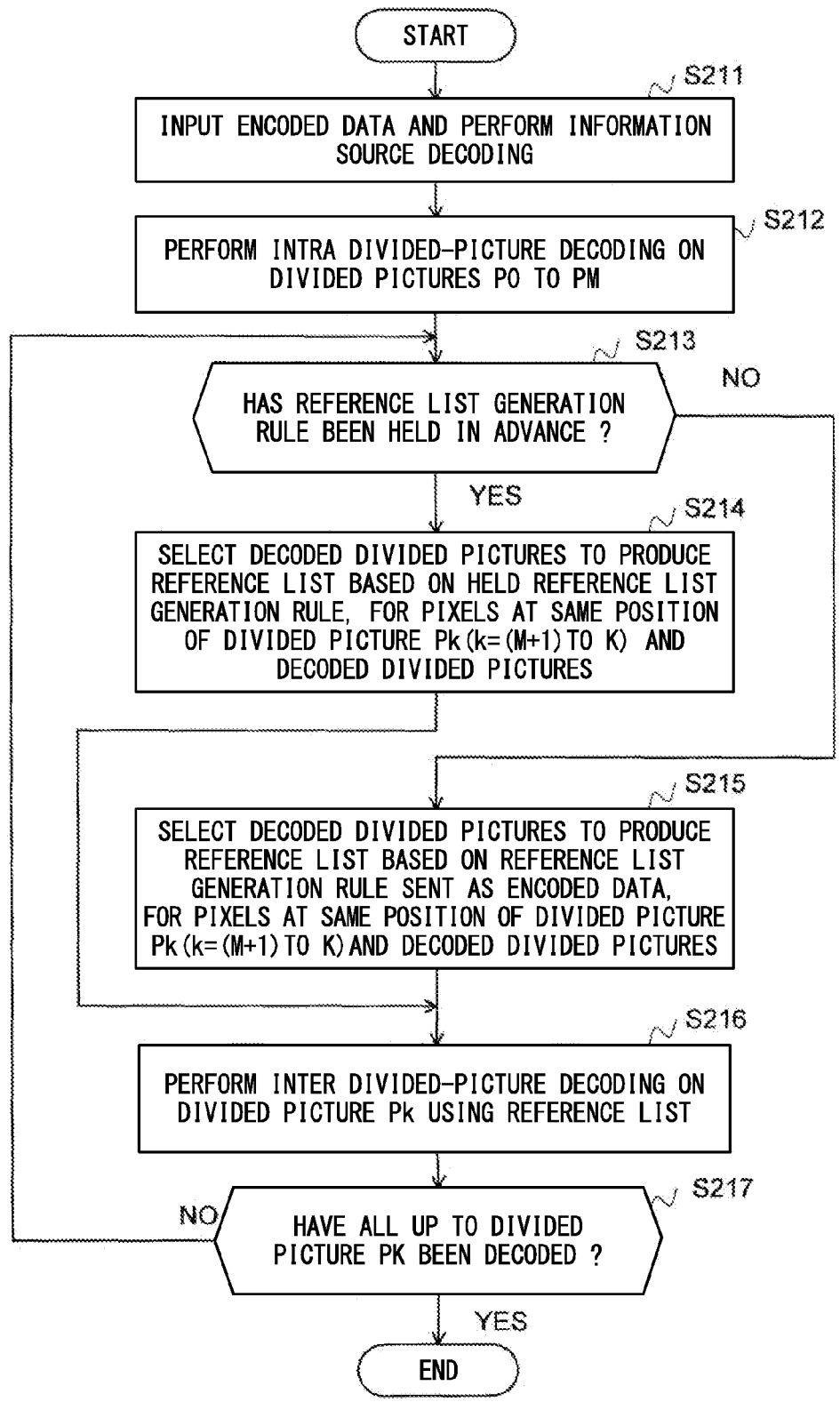
FIG. 15 is a flowchart of a picture decoding process when a reference list is used.

Next, an example of a decoding process when decoding is performed using a reference list will be described with reference to FIG. 15. A process of steps S211 and S212 in FIG. 15 is the same as the process of steps S201 and S202 described with reference to FIG. 14.

In step S213, it is determined whether the picture decoding apparatus 20 holds a reference list generation rule in advance. If a determination result is "true", the process proceeds to step S214. If the determination result is "false", the process proceeds to step S215.

In step S214, the reference picture selection unit 23 selects a decoded divided picture to produce a reference list based on the reference list generation rule held in advance, for pixels at the same position of the divided picture Pk (k=(M+1) to K) subjected to inter divided-picture predictive encoding and the decoded divided picture. The process then proceeds to step S216.

On the other hand, in step S215, the reference picture selection unit 23 selects a decoded divided picture to produce a reference list based on the reference list generation rule sent as the encoded data, for pixels at the same position of the divided picture Pk (k=(M+1) to K) subjected to inter divided-picture predictive encoding and the decoded divided picture. The process then proceeds to step S216.

In step S216, the inter divided-picture predictive decoding unit 24 performs inter divided-picture decoding on the divided picture Pk by applying a predetermined interpolation filter to the reference picture designated by the reference picture index in the reference list to generate a predicted picture using the predicted picture generation unit 242 and adding a pixel value of the predicted picture to the prediction error decoded by the prediction error decoding unit 241.

Here, when the encoding end has performed inter divided-picture predictive encoding using a predicted picture obtained by combining a plurality of predicted pictures generated from a plurality of reference pictures, the decoding end performs inter divided-picture predictive decoding using the combined predicted picture generated based on the plurality of reference pictures, as well.

Decoding of the divided picture Pk in steps S213 to S216 described above is repeated up to the last divided picture PK, and when decoding is completed up to the last divided picture PK, the decoded picture forming unit 25 generates the entire decoded picture from the decoded divided pictures P0 to PK, and the process of decoding one frame ends (step S217).

[Configuration Example Using Computer]

Figure 16:
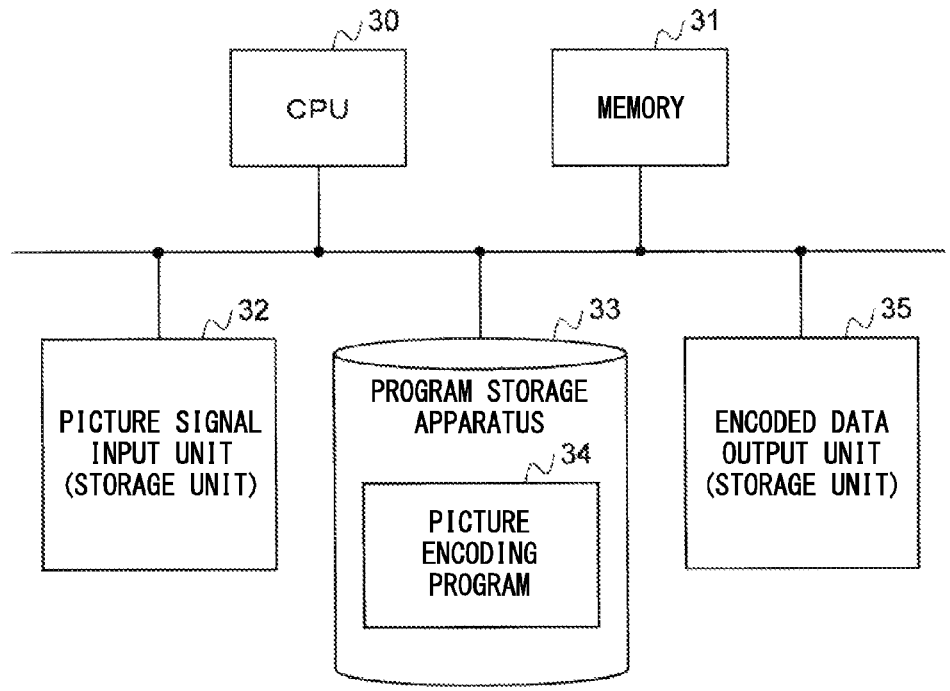
FIG. 16 is a diagram illustrating an example of a configuration of hardware when a picture encoding apparatus is realized using a software program.

FIG. 16 illustrates an example of a configuration of hardware when the picture encoding apparatus 10 of FIG. 1 is configured by a computer and a software program. The present system has a configuration in which a central processing unit (CPU) 30 which executes a program, a memory 31 such as a random access memory (RAM) in which programs and data to be accessed by the CPU 30 are stored, a picture signal input unit 32 which inputs an encoding target picture signal from a camera or the like (or a storage unit which stores a picture signal using a disk apparatus or the like), a program storage apparatus 33 in which a picture encoding program 34 which is a software program for causing the CPU 30 to execute a process of encoding an input picture using the present scheme is stored, and an encoded data output unit 35 which outputs encoded data generated by the CPU 30 executing the picture encoding program 34 loaded to the memory 31, for example, over a network (or a storage unit which stores the encoded data using a disk apparatus or the like) are connected via a bus.

It is to be noted that the picture encoding program stored in the program storage apparatus 33 may include, for example, a conventional picture encoding program which performs inter-frame prediction on a frame-by-frame basis, as well as a program which encodes an input picture through the present scheme.

Figure 17:
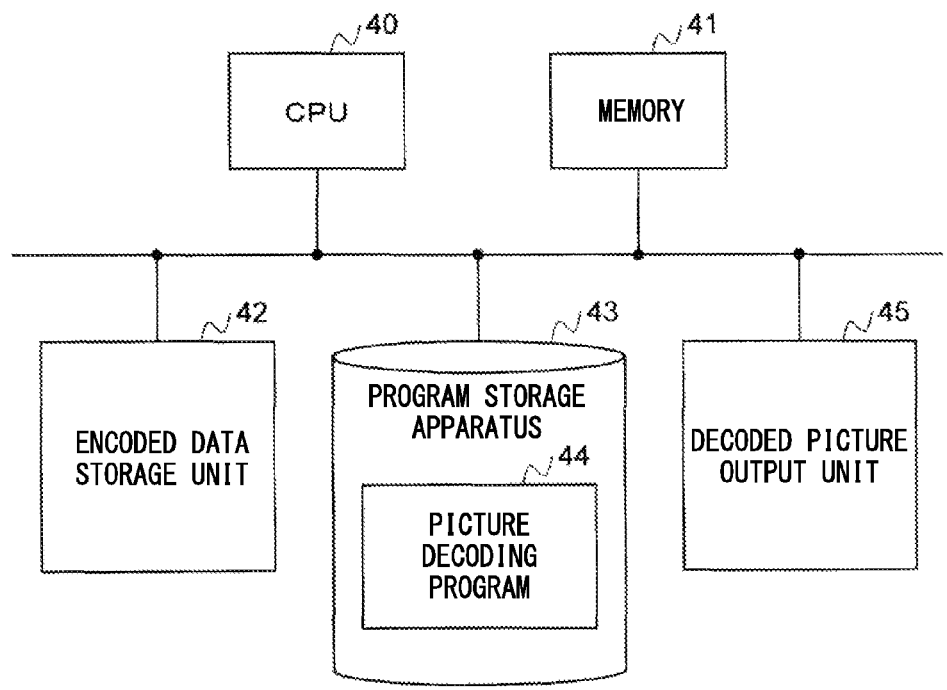
FIG. 17 is a diagram illustrating an example of a configuration of hardware when a picture decoding apparatus is realized using a software program.
Figure 18:
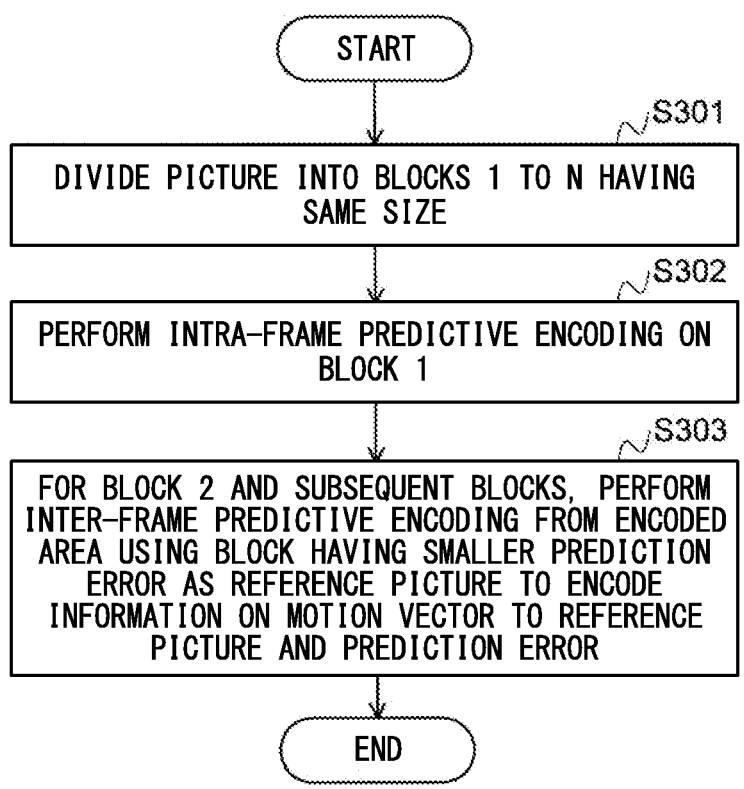
FIG. 18 is a flowchart illustrating an example of an intra-frame predictive encoding process in accordance with conventional technology.

FIG. 17 illustrates an example of a configuration of hardware when the picture decoding apparatus 20 of FIG. 13 is configured by a computer and a software program. The present system has a configuration in which a CPU 40 which executes a program, a memory 41 such as a RAM in which programs and data to be accessed by the CPU 40 is stored, an encoded data storage unit 42 (or an input unit over a network or the like) which inputs and stores the encoded data encoded by the picture encoding apparatus 10 of FIG. 1 using the present scheme, a program storage apparatus 43 in which a picture decoding program 44 which is a software program which causes the CPU 40 to execute a process of decoding encoded data using the present scheme is stored, and a decoded picture output unit 45 which outputs the decoded picture obtained by performing decoding on the encoded data by the CPU 40 executing the picture decoding program 44 loaded to the memory 41 to a reproducing apparatus or the like are connected via a bus.

It is to be noted that the picture decoding program stored in the program storage apparatus 43 may include, for example, a conventional picture decoding program which performs inter-frame prediction on a frame-by-frame basis, as well as a program which performs decoding on the encoded data through the present scheme.

While the embodiments of the present invention have been described above with reference to the drawings, it is apparent that the embodiments described above are only exemplary examples of the present invention and the present invention is not limited to the embodiments. Therefore, additions, omissions, substitutions, and other modifications of components can be made without departing from the spirit or technical scope of the present invention.

INDUSTRIAL APPLICABILITY

The present invention is applicable to encoding and decoding of pictures. In accordance with the present invention, it is possible to reduce the encoding computational complexity and the decoding computational complexity while suppressing deterioration of coding efficiency, in comparison with conventional intra-frame predictive coding.

DESCRIPTION OF REFERENCE SIGNS

10 Picture encoding apparatus
11 Divided picture generation unit
12 Intra divided-picture encoding unit
13 Reference picture selection unit
14 Inter divided-picture predictive encoding unit
141 Predicted picture generation unit
142 Prediction error calculation unit
143 Prediction error encoding unit
144 Picture decoding unit
15 Information source encoding unit
20 Picture decoding apparatus
21 Information source decoding unit
22 Intra divided-picture decoding unit
23 Reference picture selection unit
24 Inter divided-picture predictive decoding unit
241 Prediction error decoding unit
242 Predicted picture generation unit
243 Decoded picture calculation unit
25 Decoded picture forming unit

The invention claimed is:

1. A picture encoding method for performing compression encoding on an input picture, the method comprising:
a divided picture generation step of, when the input picture is divided into blocks of n×m pixels and each divided block is divided into sub-blocks having $n_1 \times m_1$ pixels (where $1 \le n_1 < n$ and $1 \le m_1 < m$), setting divided pictures having the same size each including a set of pixels of the sub-blocks having the same relative position in the blocks;
an intra divided-picture encoding step of performing intra divided-picture encoding on at least one of the divided pictures;
a reference picture selection step of selecting an encoded divided picture as a reference picture to be used for inter divided-picture predictive encoding for an encoding target divided picture in order of increasing spatial distances on an original picture for pixels at the same position in the encoding target divided picture and the encoded divided picture when a divided picture other than the divided picture subjected to the intra divided-picture encoding is encoded;
an inter divided-picture predictive encoding step of generating a predicted picture for the encoding target divided picture using the selected reference picture to perform the inter divided-picture predictive encoding; and
an information source encoding step of performing information source encoding on at least an encoding result of the intra divided-picture encoding step and an encoding result of the inter divided-picture predictive encoding step.

2. The picture encoding method according to claim 1, wherein
in the reference picture selection step, a reference list in which a plurality of selected reference pictures are arranged is designated, and a reference picture in the reference list is set as the selected reference picture, and
in the inter divided-picture predictive encoding step, the predicted picture for the encoding target divided picture is generated using one or a plurality of reference pictures among the plurality of reference pictures recorded in the reference list.

3. A picture encoding method for performing compression encoding on an input picture, the method comprising:
a divided picture generation step of, when the input picture is divided into blocks of n×m pixels and each divided block is divided into sub-blocks having $n_1 \times m_1$ pixels (where $1 \leq n_1 < n$ and $1 \leq m_1 < m$), setting divided pictures having the same size each including a set of pixels of the sub-blocks having the same relative position in the blocks;
an intra divided-picture encoding step of performing intra divided-picture encoding on at least one of the divided pictures;
a reference picture selection step of selecting an encoded divided picture as a reference picture to be used for inter divided-picture predictive encoding for an encoding target divided picture in order of increasing distances on an original picture for pixels at the same position in the encoding target divided picture and the encoded divided picture when a divided picture other than the divided picture subjected to the intra divided-picture encoding is encoded;
an inter divided-picture predictive encoding step of generating a predicted picture for the encoding target divided picture using the selected reference picture to perform the inter divided-picture predictive encoding; and
an information source encoding step of performing information source encoding on at least an encoding result of the intra divided-picture encoding step and an encoding result of the inter divided-picture predictive encoding step,
wherein in the reference picture selection step, when there are a plurality of encoded divided pictures having the same distance on the original picture, a divided picture for which the intra divided-picture encoding has been completed is preferentially selected as the reference picture over a divided picture for which the inter divided-picture predictive encoding has been completed.

4. A picture encoding method for performing compression encoding on an input picture, the method comprising:
a divided picture generation step of, when the input picture is divided into blocks of n×m pixels and each divided block is divided into sub-blocks having $n_1 \times m_1$ pixels (where $1 \leq n_1 < n$ and $1 \leq m_1 < m$) setting divided pictures having the same size each including a set of pixels of the sub-blocks having the same relative position in the blocks:
an intra divided-picture encoding step of performing intra divided-picture encoding on at least one of the divided pictures;
a reference picture selection step of selecting an encoded divided picture as a reference picture to be used for inter divided-picture predictive encoding for an encoding target divided picture in order of increasing distances on an original picture for pixels at the same position in the encoding target divided picture and the encoded divided picture when a divided picture other than the divided picture subjected to the intra divided-picture encoding is encoded;
an inter divided-picture predictive encoding step of generating a predicted picture for the encoding target divided picture using the selected reference picture to perform the inter divided-picture predictive encoding; and
an information source encoding step of performing information source encoding on at least an encoding result of the intra divided-picture encoding step and an encoding result of the inter divided-picture predictive encoding step,
wherein in the reference picture selection step, when there are a plurality of encoded divided pictures having the same distance on the original picture, an encoded divided picture having higher quantization precision is preferentially selected as the reference picture over an encoded divided picture having lower quantization precision.

5. The picture encoding method according to claim 1 or 2, wherein
in the reference picture selection step, the reference picture is selected from among a plurality of encoded divided pictures capable of being used as reference pictures based on a reference picture selection rule indicating an encoded divided picture to be preferentially selected, and
in the information source encoding step, designation information for the reference picture selection rule is encoded.

6. A picture encoding method for performing compression encoding on an input picture, the method comprising:
a divided picture generation step of, when the input picture is divided into blocks of n×m pixels and each divided block is divided into sub-blocks having $n_1 \times m_1$ pixels (where $1 \leq n_1 < n$ and $1 \leq m_1 < m$), setting divided pictures having the same size each including a set of pixels of the sub-blocks having the same relative position in the blocks;
an intra divided-picture encoding step of performing intra divided-picture encoding on at least one of the divided pictures;
a reference picture selection step of selecting an encoded divided picture as a reference picture to be used for inter divided-picture predictive encoding for an encoding target divided picture in order of increasing distances on an original picture for pixels at the same position in the encoding target divided picture and the encoded divided picture when a divided picture other than the divided picture subjected to the intra divided-picture encoding is encoded;
an inter divided-picture predictive encoding step of generating a predicted picture for the encoding target divided picture using the selected reference picture to perform the inter divided-picture predictive encoding; and
an information source encoding step of performing information source encoding on at least an encoding result of the intra divided-picture encoding step and an encoding result of the inter divided-picture predictive encoding step,
wherein in the reference picture selection step, the reference picture is selected from among a plurality of encoded divided pictures capable of being used as reference pictures based on a reference picture selection rule indicating an encoded divided picture to be preferentially selected, in the information source encoding step, designation information for the reference picture selection rule is encoded, and the reference picture selection rule includes a rule which designates to preferentially select, as the reference picture, a divided picture for which the intra divided-picture encoding has been completed over a divided picture for which the inter divided-picture predictive encoding has been completed when there are a plurality of encoded divided pictures having the same distance on the original picture, or a rule which designate to preferentially select, as the reference picture, an encoded divided picture having higher quantization precision over an encoded divided picture having lower quantization precision when there are a plurality of encoded divided pictures having the same distance on the original picture.

7. The picture encoding method according to claim 1 or 2, wherein in the inter divided-picture predictive encoding step, the inter divided-picture predictive encoding is performed using a predicted picture obtained by combining a plurality of predicted pictures generated from a plurality of reference pictures selected in the reference picture selection step.

8. The picture encoding method according to claim 1 or 2, wherein in the information source encoding step, reference picture designation information which designates the reference picture used in the inter divided-picture predictive encoding step is encoded.

9. A picture decoding method for performing decoding on encoded data of a picture subjected to compression encoding, the method comprising:

an information source decoding step of inputting and performing decoding on the encoded data obtained by, when an input picture is divided into blocks of n×m pixels and each divided block is divided into sub-blocks having $n_1 \times m_1$ pixels (where $1 \le n_1 < n$ and $1 \le m_1 < m$), a picture encoding apparatus which sets divided pictures having the same size each including a set of pixels of the sub-blocks having the same relative position in the blocks and encodes each of the divided pictures;

an intra divided-picture decoding step of performing intra divided-picture decoding on at least one of the divided pictures from data decoded in the information source decoding step;

a reference picture selection step of selecting, as a reference picture to be used for inter divided-picture predictive decoding, a decoded divided picture for a decoding target divided picture in order of increasing spatial distances on an original picture for pixels at the same position in the decoding target divided picture and the decoded divided picture when a divided picture other than the divided picture subjected to the intra divided-picture decoding is decoded;

an inter divided-picture predictive decoding step of generating a predicted picture for the decoding target divided picture using the selected reference picture and performing the inter divided-picture predictive decoding; and a decoded picture forming step of forming a decoded picture from divided pictures decoded in the intra divided-picture decoding step and the inter divided-picture predictive decoding step.

10. The picture decoding method according to claim 9, wherein in the information source decoding step, decoding is performed on encoded data which designates a reference picture selection rule indicating a decoded divided picture to be preferentially selected from among a plurality of decoded divided pictures capable of being used as reference pictures, and in the reference picture selection step, the reference picture is selected based on the decoded reference picture selection rule.

11. A picture decoding method for performing decoding on encoded data of a picture subjected to compression encoding, the method comprising:

an information source decoding step of inputting and performing decoding on the encoded data obtained by, when an input picture is divided into blocks of n×m pixels and each divided block is divided into sub-blocks having $n_1 \times m_1$ pixels (where $1 \le n_1 < n$ and $1 \le m_1 < m$), a picture encoding apparatus which sets divided pictures having the same size each including a set of pixels of the sub-blocks having the same relative position in the blocks and encodes each of the divided pictures;

an intra divided-picture decoding step of performing intra divided-picture decoding on at least one of the divided pictures from data decoded in the information source decoding step;

a reference picture selection step of selecting, as a reference picture to be used for inter divided-picture predictive decoding, a decoded divided picture for a decoding target divided picture in order of increasing distances on an original picture for pixels at the same position in the decoding target divided picture and the decoded divided picture when a divided picture other than the divided picture subjected to the intra divided-picture decoding is decoded;

an inter divided-picture predictive decoding step of generating a predicted picture for the decoding target divided picture using the selected reference picture and performing the inter divided-picture predictive decoding; and a decoded picture forming step of forming a decoded picture from divided pictures decoded in the intra divided-picture decoding step and the inter divided-picture predictive decoding step, wherein in the information source decoding step, decoding is performed on encoded data which designates a reference picture selection rule indicating a decoded divided picture to be preferentially selected from among a plurality of decoded divided pictures capable of being used as reference pictures, in the reference picture selection step, the reference picture is selected based on the decoded reference picture selection rule, and the reference picture selection rule includes a rule which designates to preferentially select, as the reference picture, a divided picture for which the intra divided-picture decoding has been completed over a divided picture for which the inter divided-picture predictive decoding has been completed when there are a plurality of decoded divided pictures having the same distance on the original picture, or a rule which designates to preferentially select, as the reference picture, a decoded divided picture having higher quantization precision over a decoded divided picture having lower quantization precision when there are a plurality of decoded divided pictures having the same distance on the original picture.

12. The picture decoding method according to any one of claims 9, 10, and 11, wherein in the inter divided-picture predictive decoding step, the inter divided-picture predictive decoding is performed using a predicted picture obtained by combining a plurality of predicted pictures generated from a plurality of reference pictures selected in the reference picture selection step.

13. The picture decoding method according to any one of claims 9, 10, and 11, wherein
in the information source decoding step, reference picture designation information which designates the reference picture is decoded, and
in the reference picture selection step, the reference picture designated by the decoded reference picture designation information is selected.

14. A picture encoding apparatus for performing compression encoding on an input picture, the apparatus comprising:
a divided picture generation unit which, when the input picture is divided into blocks of n×m pixels and each divided block is divided into sub-blocks having $n_1 \times m_1$ pixels (where $1 \leq n_1 < n$ and $1 \leq m_1 < m$), sets divided pictures having the same size including a set of pixels of the sub-blocks having the same relative position in the blocks;
an intra divided-picture encoding unit which performs intra divided-picture encoding on at least one of the divided pictures;
a reference picture selection unit which selects an encoded divided picture as a reference picture to be used for inter divided-picture predictive encoding for an encoding target divided picture in order of increasing spatial distances on an original picture for pixels at the same position in the encoding target divided picture and the encoded divided picture when a divided picture other than the divided picture subjected to the intra divided-picture encoding is encoded;
an inter divided-picture predictive encoding unit which generates a predicted picture for the encoding target divided picture using the selected reference picture to perform the inter divided-picture predictive encoding; and
an information source encoding unit which performs information source encoding on at least an encoding result of the intra divided-picture encoding unit and an encoding result of the inter divided-picture predictive encoding unit.

15. A picture decoding apparatus for performing decoding on encoded data of a picture subjected to compression encoding, the apparatus comprising:
an information source decoding unit which inputs and performs decoding on the encoded data obtained by, when an input picture is divided into blocks of n×m pixels and each divided block is divided into sub-blocks having $n_1 \times m_1$ pixels (where $1 \leq n_1 < n$ and $1 \leq m_1 < m$), a picture encoding apparatus which sets divided pictures having the same size each including a set of pixels of the sub-blocks having the same relative position in the blocks and encodes each of the divided pictures;
an intra divided-picture decoding unit which performs intra divided-picture decoding on at least one of the divided pictures from data decoded by the information source decoding unit;
a reference picture selection unit which selects, as a reference picture to be used for inter divided-picture predictive decoding, a decoded divided picture for a decoding target divided picture in order of increasing spatial distances on an original picture for pixels at the same position in the decoding target divided picture and the decoded divided picture when a divided picture other than the divided picture subjected to the intra divided-picture decoding is decoded;
an inter divided-picture predictive decoding unit which generates a predicted picture for the decoding target divided picture using the selected reference picture and performs the inter divided-picture predictive decoding; and
a decoded picture forming unit which forms a decoded picture from divided pictures decoded by the intra divided-picture decoding unit and the inter divided-picture predictive decoding unit.

16. A non-transitory computer-readable medium storing a picture encoding program for causing a computer to execute the picture encoding method according to claim 1 or 2.

17. A non-transitory computer-readable medium storing a picture decoding program of causing a computer to execute the picture decoding method according to any one of claims 9, 10, and 11.

18. The picture encoding method according to any one of claims 3, 4, and 6, wherein
in the reference picture selection step, a reference list in which a plurality of selected reference pictures are arranged is designated, and a reference picture in the reference list is set as the selected reference picture, and
in the inter divided-picture predictive encoding step, the predicted picture for the encoding target divided picture is generated using one or a plurality of reference pictures among the plurality of reference pictures recorded in the reference list.

* * * * *